US009669501B1

(12) United States Patent
Dolan et al.

(10) Patent No.: US 9,669,501 B1
(45) Date of Patent: Jun. 6, 2017

(54) STEERING SPINDLE REPAIR KIT AND ASSOCIATED APPARATUS AND METHODS

(71) Applicant: Stemco, LP, Longview, TX (US)

(72) Inventors: Paul Dolan, Clio, MI (US); Paul M. Buda, Bay City, MI (US); Eric Downing, Bay City, MI (US); Bill Chirrey, Thornhill (CA)

(73) Assignee: Stemco LP, Longview, TX (US)

( * ) Notice: Subject to any disclaimer, the term of this patent is extended or adjusted under 35 U.S.C. 154(b) by 337 days.

(21) Appl. No.: 14/491,475

(22) Filed: Sep. 19, 2014

Related U.S. Application Data

(60) Provisional application No. 61/881,295, filed on Sep. 23, 2013.

(51) Int. Cl.
| *B23B 41/12* | (2006.01) |
| *B23P 19/04* | (2006.01) |
| *B23Q 17/22* | (2006.01) |

(52) U.S. Cl.
CPC .............. *B23P 19/04* (2013.01); *B23B 41/12* (2013.01); *B23Q 17/2275* (2013.01); *Y10T 408/39* (2015.01); *Y10T 408/553* (2015.01); *Y10T 408/558* (2015.01)

(58) Field of Classification Search
CPC . B23B 41/12; B23B 51/0426; B23Q 17/2266; B23Q 17/2275; Y10T 408/553; Y10T 408/558; Y10T 408/5583; Y10T 408/39
See application file for complete search history.

(56) References Cited

U.S. PATENT DOCUMENTS

| 1,135,460 | A | * | 4/1915 | Martell | .................. | B23Q 3/062 |
| | | | | | | 29/898.057 |
| 1,382,842 | A | * | 6/1921 | Martell | .................. | B23B 41/12 |
| | | | | | | 408/75 |
| 1,512,999 | A | * | 10/1924 | Muehlberg | ............. | B23Q 3/062 |
| | | | | | | 408/707 |
| 1,751,708 | A | * | 3/1930 | Neller | ..................... | B23B 41/12 |
| | | | | | | 269/118 |
| 2,274,964 | A | * | 3/1942 | James | ..................... | B23B 41/12 |
| | | | | | | 29/898.01 |
| 2,834,233 | A | * | 5/1958 | Anderson | .............. | B23D 75/00 |
| | | | | | | 408/115 R |
| 2,844,053 | A | * | 7/1958 | Wagner | ................... | B23B 41/12 |
| | | | | | | 33/637 |
| 3,674,375 | A | * | 7/1972 | Reed et al. | ............. | B25B 27/30 |
| | | | | | | 408/103 |

(Continued)

*Primary Examiner* — Daniel Howell
(74) *Attorney, Agent, or Firm* — Perkins Coie LLP

(57) ABSTRACT

A spindle repair kit including a pair of alignment mandrels positionable in a respective spindle bore of a steering spindle. An alignment rod is operative to retain the mandrels in their respective spindle bores. The kit can also include a first clamp member and a second clamp member, each being positionable between the spindle bores. The kit includes a drill fixture including a drill mounting surface and a bearing fixture including a bearing aperture sized to receive the alignment rod. Fasteners clamp the drill fixture and first clamp member to the first spindle bore and clamp the bearing holder and second clamp member to the second spindle bore. The kit includes an arbor connectable to a drill and a reamer, wherein the arbor is sized to position the reamer in the first spindle bore.

13 Claims, 21 Drawing Sheets

(56) References Cited

U.S. PATENT DOCUMENTS

| | | | | |
|---|---|---|---|---|
| 4,346,508 | A | * | 8/1982 | Baumann ............... B23B 41/00 29/402.18 |
| 4,455,732 | A | | 6/1984 | Shiets et al. |
| 4,571,795 | A | | 2/1986 | Shiets et al. |
| 4,820,089 | A | | 4/1989 | Shiets et al. |
| 4,828,328 | A | | 5/1989 | Bowman |
| 4,850,756 | A | * | 7/1989 | Dubois .................. B23B 29/02 408/708 |
| 4,932,814 | A | | 6/1990 | York et al. |
| 4,969,246 | A | | 11/1990 | Shiets et al. |
| 4,997,321 | A | | 3/1991 | Adams et al. |
| 5,077,882 | A | | 1/1992 | Adams et al. |
| 5,628,591 | A | * | 5/1997 | Gamble ................. B23B 29/02 408/708 |
| 5,655,278 | A | * | 8/1997 | Harmand ............... B23B 29/02 29/33 R |
| 5,785,466 | A | * | 7/1998 | Haynes .................. B23B 41/12 408/103 |
| 5,966,812 | A | | 10/1999 | Shiets et al. |
| 6,024,418 | A | | 2/2000 | Ebert et al. |
| 6,447,220 | B1 | | 9/2002 | Ricci et al. |
| 7,066,690 | B2 | | 6/2006 | Ebert et al. |
| 7,716,799 | B2 | | 5/2010 | Ebert et al. |
| 7,832,073 | B2 | | 11/2010 | Ebert et al. |

\* cited by examiner

STEERING SPINDLE REPAIR KIT AND ASSOCIATED APPARATUS AND METHODS

CROSS-REFERENCE TO RELATED APPLICATIONS

The present application claims the benefit of U.S. Provisional Patent Application No. 61/881,295, filed Sep. 23, 2013, the disclosure of which is incorporated herein by reference in its entirety.

TECHNICAL FIELD

The present technology is generally directed to automotive repair equipment. More specifically, embodiments are directed to steering spindle bore repair kits, associated apparatus, and methods.

BACKGROUND

Although a kingpin type steering system is a rugged design that is used on heavy trucks such as semi-tractor trailers, the upper and lower spindle bores are susceptible to wear and may become obround or oversized. Distortion of the spindle bores may cause the steering system to develop unwanted play resulting in loss of steering control and difficulty maintaining wheel alignment.

Spindle bores may be repaired by machining both the upper and lower bores to accommodate oversized bushings. However, traditional spindle repair techniques entail disassembling the spindle from the vehicle and sending the spindle away to a machine shop, or machining the spindle in house. At the machine shop, the spindle is mounted in a conventional mill. In order to ensure proper alignment between the spindle bores and the mill, it is necessary to index both the upper and lower bores and adjust the spindle's position so that it is mounted accurately. Properly indexing a spindle on a mill requires specialized personnel and equipment. This traditional approach is both expensive and time consuming, especially when considering the time necessary to ship or transport the spindle to a machine shop.

Accordingly, there is a need for a steering spindle repair kit and methods that allow for spindle repair in the field. There is a further need for a repair kit that allows for proper alignment with the spindle bores without specialized personnel and equipment.

SUMMARY

Disclosed herein are spindle repair kits and associated apparatus and methods for repairing steering spindles having first and second bores that are concentric to each other. In a representative embodiment, a spindle repair kit comprises a pair of alignment mandrels, each of which is positionable in a respective one of a steering spindle's first and second spindle bores. An elongate alignment rod is connectable to the alignment mandrels and is operative to retain the mandrels in their respective spindle bores. A first clamp member is positionable between the spindle bores, and a drill fixture including an alignment aperture fits over one of the alignment mandrels. The drill fixture can include an aperture sized to fit over the mandrel. The drill fixture can also include a drill mounting surface for mounting a magnetic drill press, or the like. The kit can also include a first plurality of fasteners for clamping the drill fixture and first clamp member to the first spindle bore.

In one aspect of the disclosed technology, the kit can further comprise instructions including information at least partially related to the use of the alignment mandrels. In other aspects of the technology, the kit can include a drill mountable to the drill mounting surface, such as a magnetic drill press. In further aspects of the technology, the kit can include an arbor that includes a first end portion connectable to a drill and a second end portion connectable to a reamer.

In another representative embodiment, the kit can further include a second clamp member positionable between the spindle bores, and a bearing fixture including a bearing aperture sized to receive an alignment mandrel. The kit can also include a second plurality of fasteners for clamping the bearing holder and second clamp member to the second spindle bore. The kit can further include a bearing positionable in the bearing aperture and an arbor shaft connectable to the second end portion of the arbor, the arbor shaft being sized to extend through the bearing. In some embodiments, the kit can include an arbor extension that is positionable between the drill and arbor and sized to position the reamer in the second spindle bore.

In a further representative embodiment, a spindle repair kit includes a pair of alignment mandrels, each of which includes a frustoconical portion positionable in a respective one of first and second spindle bores of a steering spindle. An elongate alignment rod is extendable through the alignment mandrels and is operative to retain the mandrels in their respective spindle bores. The kit can also include a first clamp member and a second clamp member, each being positionable between the spindle bores of the spindle. The kit includes a drill fixture including a drill mounting surface and an alignment aperture sized to receive an alignment mandrel, and a bearing fixture including a bearing aperture sized to receive an alignment mandrel. A first plurality of fasteners clamp the drill fixture and first clamp member to the first spindle bore and a second plurality of fasteners clamp the bearing holder and second clamp member to the second spindle bore. The kit includes an arbor including a first end portion connectable to a drill and a second end portion connectable to a reamer, wherein the arbor is sized to position the reamer in the first spindle bore. The kit also includes a bearing positionable in the bearing aperture and an arbor shaft connectable to the second end portion of the arbor and sized to extend through the bearing. An arbor extension is positionable between the drill and arbor and is sized to position the reamer in the second spindle bore.

In one aspect of the disclosed technology, the kit can further comprise instructions including information at least partially related to the use of the alignment mandrels, drill fixture, bearing fixture, and arbor extension. In other aspects of the technology the kit can include a bearing holder that is positionable in the bearing aperture wherein the bearing is retained in the bearing holder. In further aspects of the technology, the kit can include an alignment bushing that is positionable around the reamer and within the alignment aperture. In some embodiments, the second end portion of the arbor can include female threads and the arbor extension can include a mating male threaded portion.

In another representative embodiment, a spindle repair kit comprises a pair of alignment mandrels, each positionable in a respective one of the first and second spindle bores. An elongate alignment rod is connectable to the alignment mandrels and operative to retain the mandrels in their respective spindle bores. A first clamp member is positionable between the spindle bores. The kit can also include a drill fixture including a drill mounting surface and a bearing fixture including a bearing aperture sized to receive the elongate alignment rod. A first plurality of fasteners are capable of clamping the drill fixture and first clamp member to the first spindle bore and a second clamp member is positionable between the spindle bores.

In a still further representative embodiment, a spindle repair kit comprises a pair of alignment mandrels, each including a frustoconical portion positionable in a respective one of the first and second spindle bores and an elongate alignment rod extendable through the alignment mandrels and operative to retain the mandrels in their respective spindle bores. A first clamp member and a second clamp member, are each positionable between the spindle bores. The kit can include a drill fixture including a drill mounting surface and a bearing fixture including a bearing aperture and a bearing positionable in the bearing aperture. A first plurality of fasteners is capable of clamping the drill fixture and first clamp member to the first spindle bore and a second plurality of fasteners is capable of clamping the bearing holder and second clamp member to the second spindle bore. A drill rod is provided that includes a first end portion connectable to a drill and a second end portion extendable through the bearing, wherein a reamer can be selectively positioned between the first end portion and second end portion. In some embodiments, the kit further comprises an upper bearing fixture attachable to the drill fixture.

Also described herein are methods for repairing a spindle having first and second spindle bores. In a representative embodiment, the method comprises positioning an alignment mandrel in each of the first and second spindle bores; temporarily retaining the alignment mandrels in their respective spindle bores; positioning an alignment aperture of a drill fixture about one of the mandrels and retaining the drill fixture in position with respect to the spindle; removing the mandrels from the first and second spindle bores; connecting a reamer to a drill; mounting the drill to the drill fixture while aligning the reamer with the alignment aperture; and operating the drill to repair at least one of the first and second spindle bores. In some embodiments the method can include piloting the reamer in relation to both the first and second spindle bores. In an embodiment, the reamer is piloted with respect to the first spindle bore with an alignment bushing disposed in the alignment aperture of the drill fixture and the reamer is piloted with respect to the second spindle bore by a bearing positioned concentric to the second bore and a shaft extending away from the reamer and through the bearing.

In one aspect of the disclosed technology, the method can further include positioning a bearing aperture of a bearing fixture about one of the mandrels and retaining the bearing fixture in position with respect to the spindle. In another aspect of the disclosed technology, the method can include connecting the reamer to the drill with an arbor. The method can also include mounting a bearing in the bearing aperture, inserting an arbor shaft through the bearing, and attaching the arbor shaft to the arbor. In other aspects of the technology the method can include installing an arbor extension between the drill and arbor and operating the drill to repair the second spindle bore.

In another embodiment, the method comprises positioning an alignment mandrel in each of the first and second spindle bores. The alignment mandrels are temporarily retained in their respective spindle bores with an alignment rod. An alignment aperture of a bearing fixture is positioned about the alignment rod and retaining the bearing fixture in position with respect to the spindle. A drill fixture is retained in position with respect to the spindle. A drill is mounted to the drill fixture while aligning the drill with the alignment rod. The mandrels and the alignment rod are subsequently removed from the first and second spindle bores. A reamer is connected to the drill and the drill is operated to repair at least one of the first and second spindle bores. In some embodiments, the method further comprises connecting the reamer to the drill with an arbor or a drill rod, for example. In some embodiments, the method further comprises positioning the drill rod in the alignment aperture.

These and other aspects of the disclosed technology will be apparent after consideration of the Detailed Description and figures herein. It is to be understood, however, that the scope of the invention shall be determined by the claims as issued and not by whether given subject matter addresses any or all issues noted in the background or includes any features or aspects recited in this summary.

BRIEF DESCRIPTION OF THE DRAWINGS

Non-limiting and non-exhaustive embodiments of the kits, apparatus, and methods, including the preferred embodiment, are described with reference to the following figures, wherein like reference numerals refer to like parts throughout the various views unless otherwise specified.

DETAILED DESCRIPTION

Disclosed herein are spindle repair kits and associated apparatus and methods for repairing steering spindles having first and second (e.g., upper and lower) bores that are concentric to each other. Specific details of several embodiments of the technology are described below with reference to FIGS. 1-22. Other details describing well-known structures and systems often associated with steering systems have not been set forth in the following disclosure to avoid unnecessarily obscuring the description of the various embodiments of the technology. Many of the details, dimensions, angles, and other features shown in the figures are merely illustrative of particular embodiments of the technology. Accordingly, other embodiments can have other details, dimensions, angles, and features without departing from the spirit or scope of the present technology. A person of ordinary skill in the art, therefore, will accordingly understand that the technology may have other embodiments with additional elements, or the technology may have other embodiments without several of the features shown and described below with reference to FIGS. 1-22.

Figure 1:
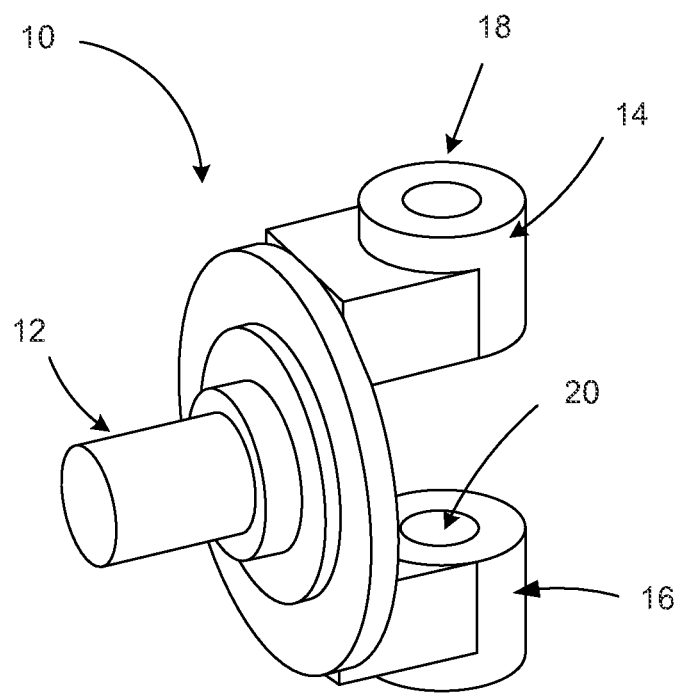
FIG. 1 is a perspective view of a prior art steering spindle.

FIG. 1 is illustrative of a typical prior art kingpin type steering spindle 10. A steering spindle may also be referred to as a steering knuckle or simply a spindle. Steering spindle 10 includes a wheel spindle or axle 12 to which a wheel and brake rotor or brake drum (not shown) is attached. Wheel spindle 12 is connected to upper and lower spindle arms 14 and 16, respectively. Each spindle arm includes a spindle bore. For example, upper spindle arm 14 includes upper spindle bore 18 and lower spindle arm 16 includes lower spindle bore 20. The steering spindle 10 attaches to an axle (not shown) with a kingpin (not shown) that extends through the upper and lower spindle bores 18 and 20. Accordingly, the upper and lower spindle bores 18 and 20 are concentric to each other. Although a kingpin type steering system is a rugged design, which is used on heavy trucks such as heavy-duty pick-up trucks and semi-tractor trailers, the upper and lower spindle bores 18 and 20 are susceptible to wear and may become obround or oversized such that the steering system develops unwanted play. As known in the art, steering spindle 10 may also include a steering arm (not shown) which attaches to associated tie rods for steering control.

Figure 2:
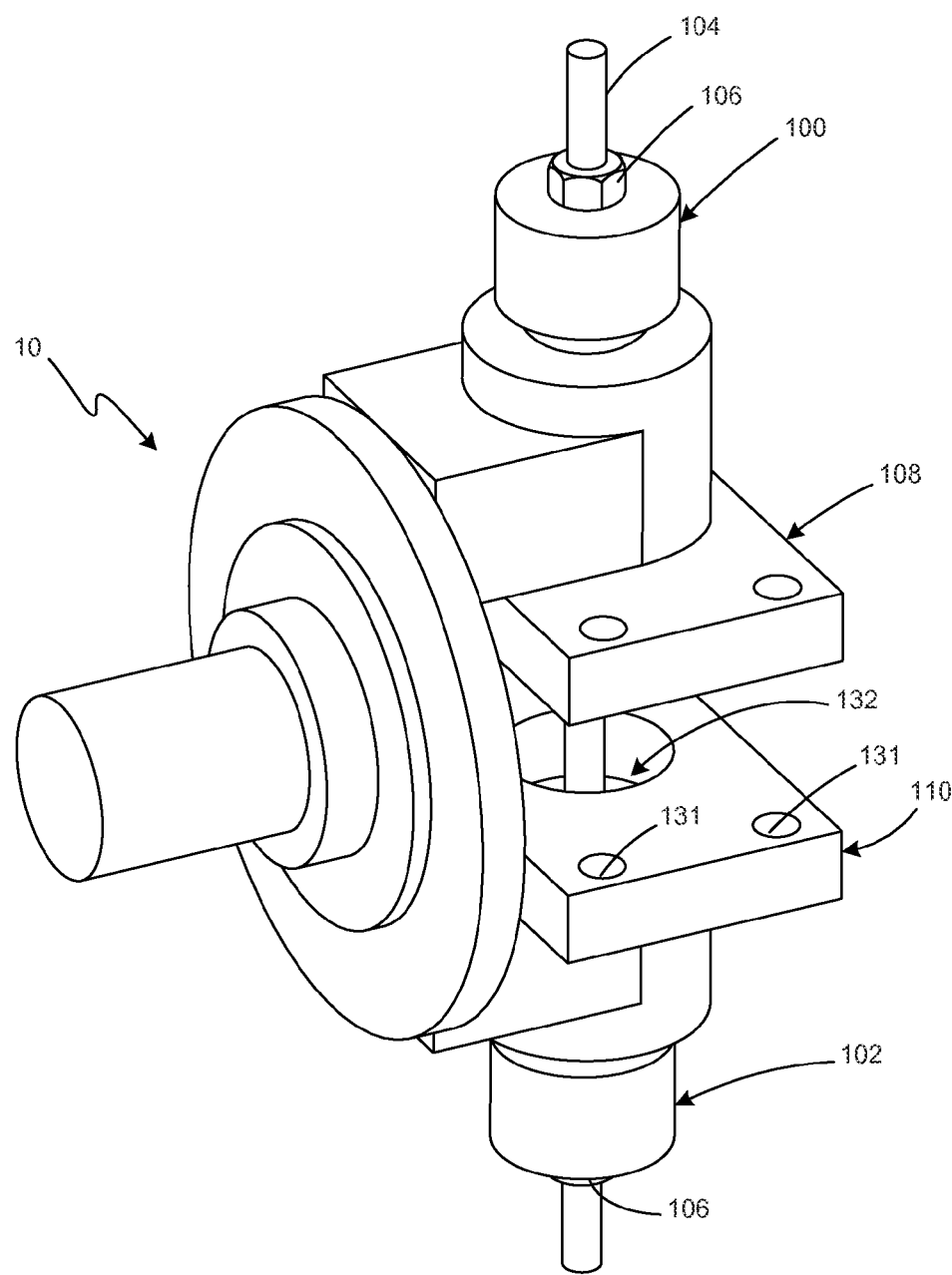
FIG. 2 is a perspective view of a steering spindle fitted with alignment mandrels according to an exemplary embodiment.

Once the spindle bores 18 and 20 have worn, it is desirable to repair the bores such that bushings may be fitted into the bores, thereby restoring the proper clearances between the bores and the kingpin. In repairing the upper and lower spindle bores 18 and 20, it is necessary to maintain the concentricity of the bores with respect to each other. Accordingly, it is necessary to maintain proper alignment of any repair tool used to resurface the inside surfaces of the upper and lower bores. Disclosed herein is a spindle repair kit which maintains alignment between the bores. The disclosed apparatus and methods may be implemented in the field without sending the parts away for specialized machining. With reference to FIG. 2, a pair of alignment mandrels (100, 102) are positioned in the upper and lower spindle bores 18 and 20, respectively. Mandrels 100 and 102 are retained in the spindle bores by an alignment rod 104 that is operative to retain the mandrels in their respective bores. In this embodiment, the alignment rod is a threaded rod which is secured to the mandrels (100, 102) by a pair of threaded nuts 106. A pair of clamping members 108 and 110 are positioned between the upper and lower spindle arms 14 and 16. As shown in the figure, the alignment rod 104 extends through apertures 132, 134 (see FIG. 4) formed through clamp plates 110 and 108, respectively. In this embodiment, the clamping members 108 and 110 are in the form of plates. The components of the kits may be constructed of any suitable material, such as steel and/or aluminum, for example.

Figure 3:
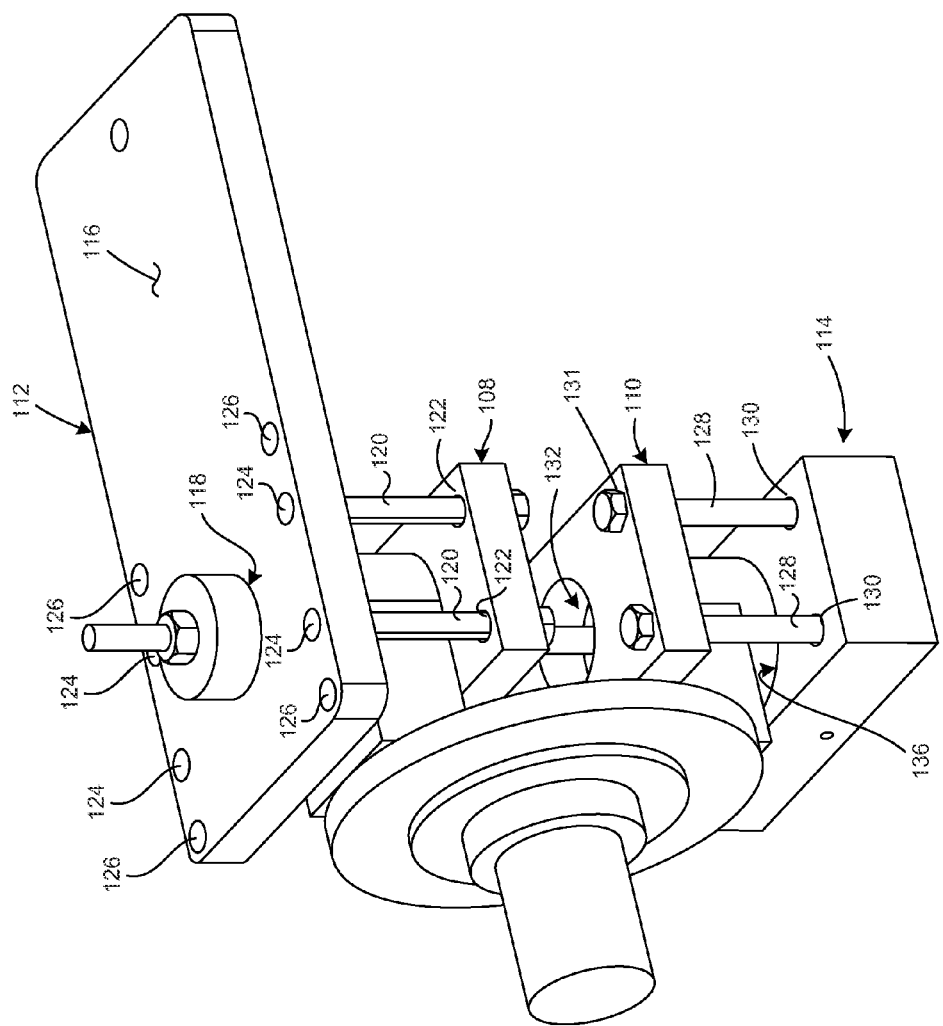
FIG. 3 is a perspective view of a steering spindle with a drill fixture and a bearing fixture installed.

With further reference to FIG. 3, a drill fixture 112 is positioned over alignment mandrel 100. Drill fixture 112 includes an alignment aperture 118 sized to fit closely with the outer diameter of alignment mandrel 100. Drill fixture 112 is secured to the upper spindle arm 14 with a plurality of fasteners 120 which extend through clamp member 108 and thread into mating threaded holes 124 formed through the drill fixture. Accordingly, clamp member 108 includes a plurality of through holes 122 to accept fasteners 120. In this embodiment, fasteners 120 may be cap screws, which thread into threaded bores 124. However, in other embodiments, the fasteners 120 can extend through drill fixture 112 and mate with nuts. Drill fixture 112 may also include other bolt hole patterns, such as threaded holes 126, in order to accommodate different sized clamping members for repairing different sized spindles. Furthermore, the through holes and threaded holes may be reversed between the clamp members and fixtures. Drill fixture 112 also includes a drill mounting surface 116, which serves as a platform for attaching a drill.

FIG. 3 also illustrates a bearing fixture 114, which is clamped about the lower spindle bore 20. Bearing fixture 114 includes a bearing aperture 136, sized to receive alignment mandrel 102 therethrough. Similar to drill fixture 112, the bearing fixture 114 is clamped to the lower spindle arm 16 by a plurality of fasteners 128 which extend through holes 131 formed through clamp member 110 and screw into threaded holes 130.

Figure 4:
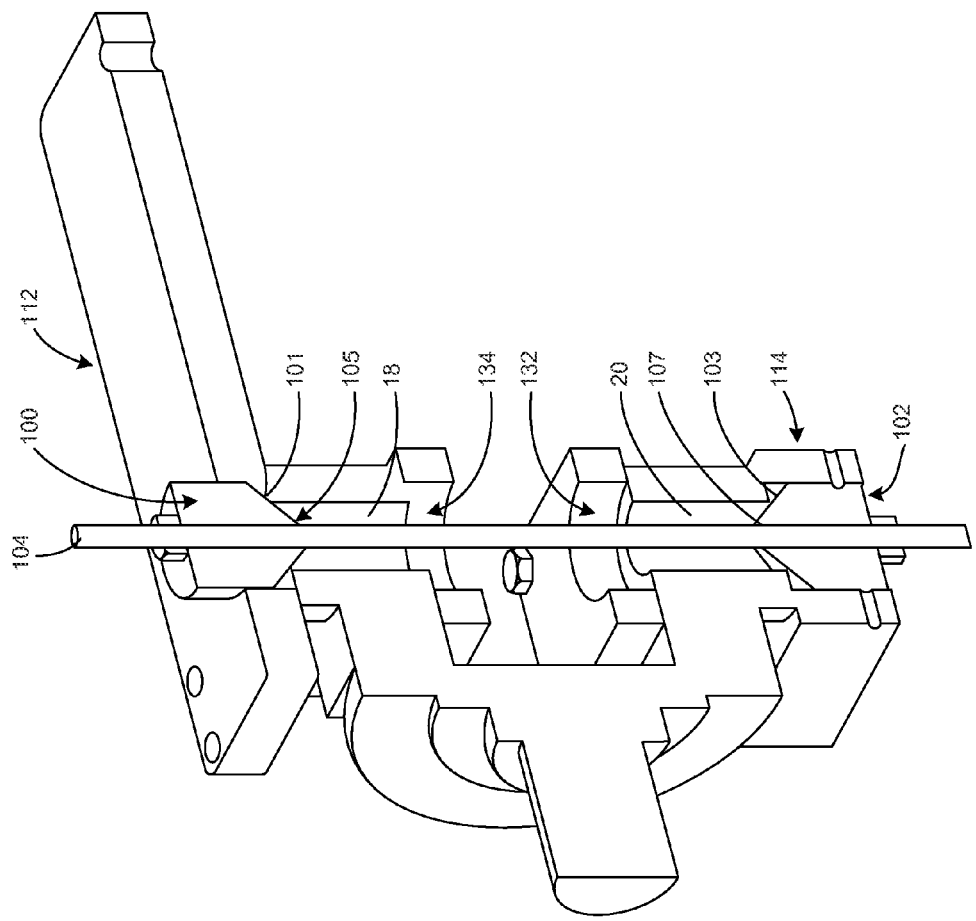
FIG. 4 is a cross-sectional perspective view of the steering spindle shown in FIG. 3 with the drill fixture and bearing fixture attached thereto.

As may be best appreciated with reference to FIG. 4, the drill fixture 112 and bearing fixture 114 are positioned concentric to the upper and lower spindle bores 18 and 20 by alignment mandrels 100 and 102. In some embodiments, the alignment mandrels 100 and 102 include a frustoconical portion which self-aligns with the bore diameter of the spindle bores. For example, alignment mandrel 100 includes a frustoconical portion 101 and alignment mandrel 102 includes a frustoconical portion 103. It can be appreciated that the frustoconical portion is compatible with different sized spindle bores such that the disclosed spindle bore repair kit may be used with different steering spindle applications. Also shown in FIG. 4, each alignment mandrel 100, 102 includes a through bore 105 and 107, respectively, which receives the threaded alignment rod 104 for securing the alignment mandrels in the spindle bores.

Figure 5:
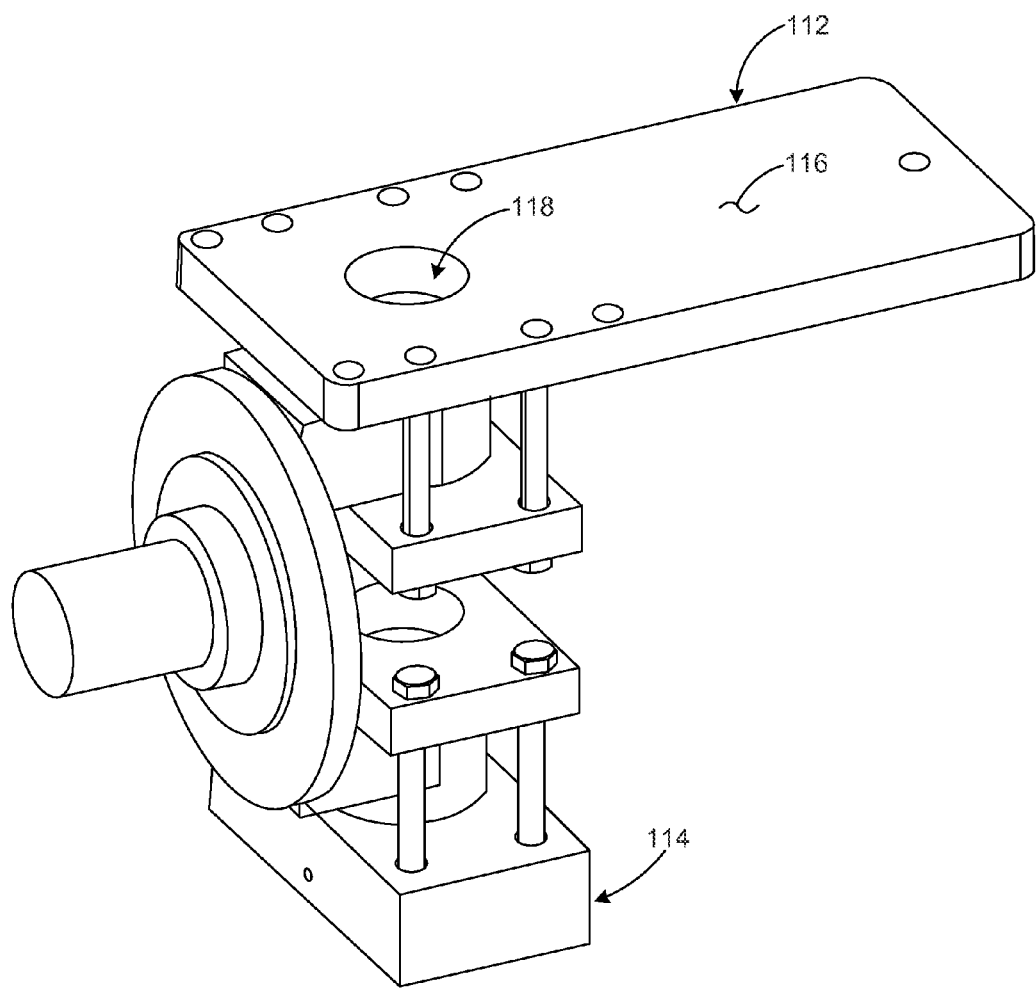
FIG. 5 is a perspective view of the steering spindle and alignment fixtures attached thereto with the alignment mandrels removed.
Figure 6:
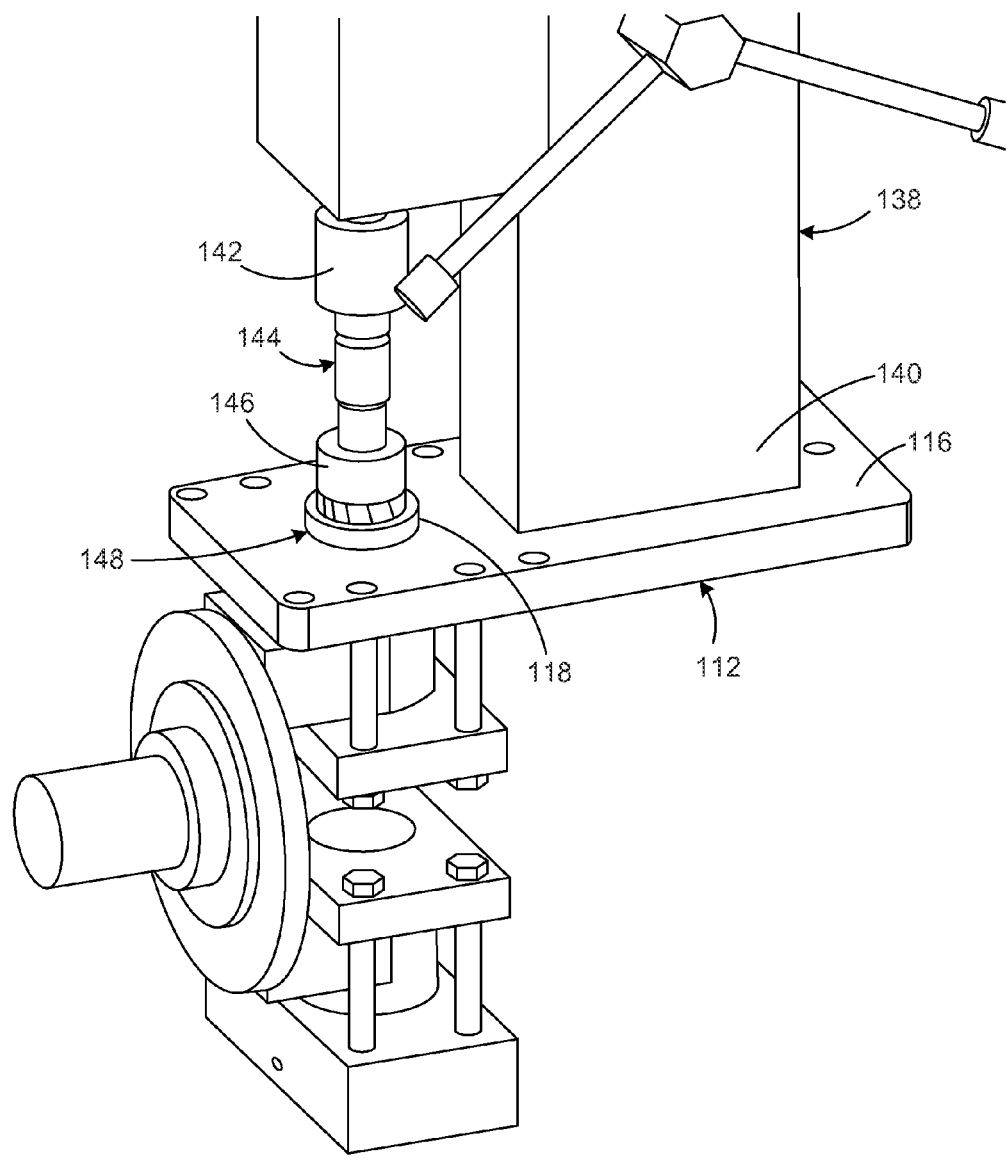
FIG. 6 is a perspective view of the steering spindle and repair kit configured for repairing the upper spindle bore.

Once the drill fixture 112 and bearing fixture 114 are clamped in position about the upper and lower spindle arms, the alignment mandrels 100, 102 and alignment rod 104 may be removed from the assembly as shown in FIG. 5. With the alignment mandrels removed, a drill press may be aligned with the alignment aperture 118 such that the spindle bores may be machined. With further reference to FIG. 6, drill press 138 is attached to the drill mounting surface 116 while aligning the drill chuck 142 with the alignment aperture 118. Drill press 138 may be a magnetic drill press which has a magnetic base 140 that can be positioned on surface 116 and then locked in place by activating the base's magnet. Drill chuck 142 receives an arbor 144, which in turn holds a reamer 146 that is operative to refinish the spindle bores. In this embodiment, the reamer 146 is a shell reamer as is known in the art. An alignment bushing 148 is positioned in the alignment aperture 118 and around shell reamer 146 in order to facilitate alignment of the drill press with the alignment aperture 118. Once the drill press 138 is properly aligned and attached to the drill fixture 112 the alignment bushing 148 may be removed from the alignment aperture 118.

Figure 7:
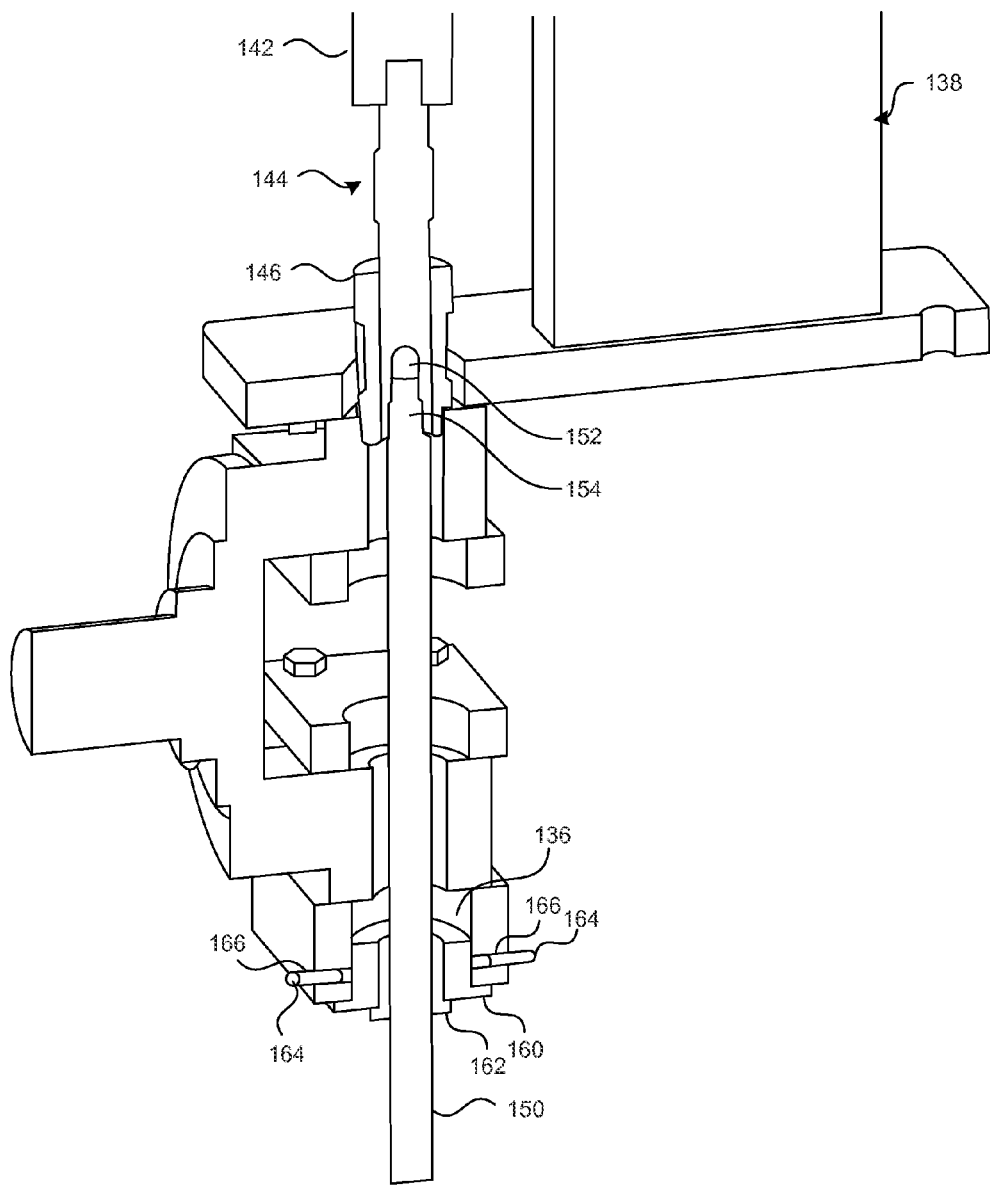
FIG. 7 is a cross-sectional perspective view of the repair kit configuration shown in FIG. 6.
Figure 8:
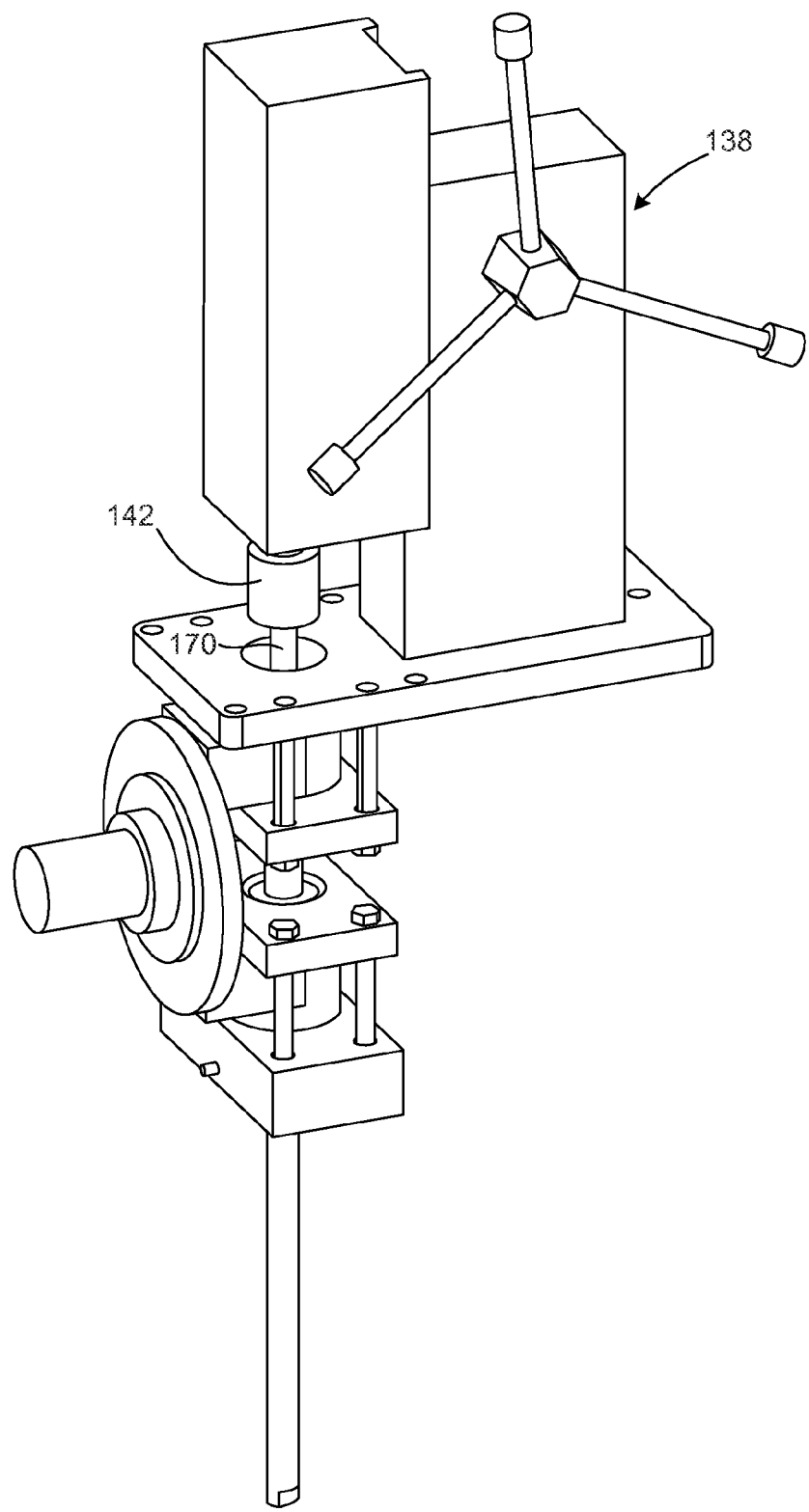
FIG. 8 is a perspective view of the repair kit configured to repair the lower spindle bore of the steering spindle.
Figure 9:
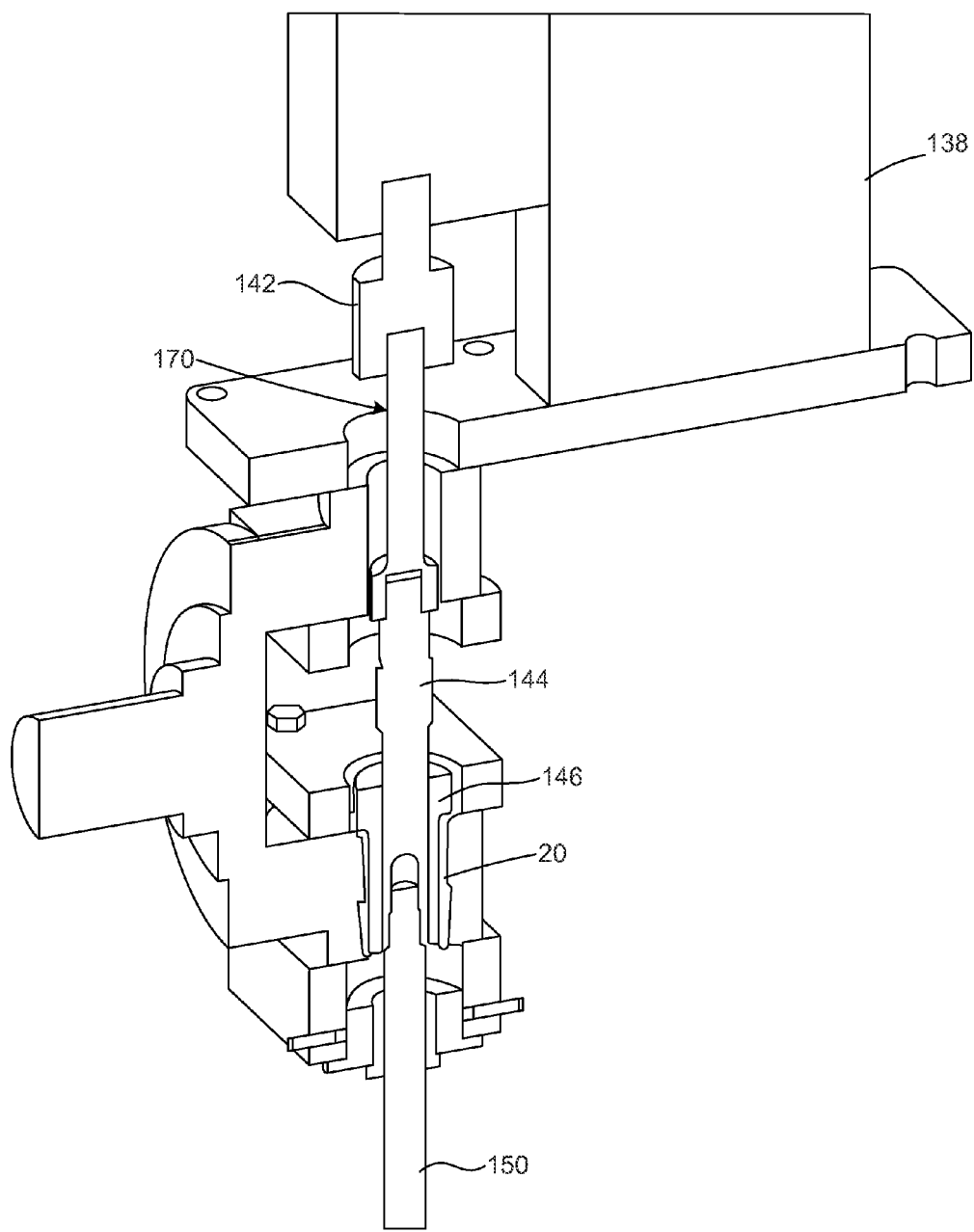
FIG. 9 is a cross-sectional perspective view of the repair kit configuration shown in FIG. 8.

FIG. 7 shows the repair kit configured to machine the upper spindle bore 18. Arbor 144 may be a conventional arbor used with machine tools; however, in this embodiment, arbor 144 has been modified with the addition of female threads 152, which are configured to receive a mating male threaded portion 154 of an arbor shaft 150. Thus, arbor 144 includes a first end portion connectable to drill chuck 142 and a second end portion connectable to reamer 146 and arbor shaft 150. Arbor shaft 150 extends from the arbor 144 through a bearing 162, which is housed in a bearing insert 160 that is sized to fit into the bearing aperture 136. Bearing insert 160 is retained in the bearing aperture with a pair of set screws 164, which are threaded into mating female threaded holes 166. It can be appreciated that arbor shaft 150 helps maintain reamer 146 concentric to both the upper and lower bearing bores. Once the upper bearing bore or spindle bore is machined, the spindle repair kit may be reconfigured to extend the reamer 146 away from drill chuck 142 such that the second spindle bore may be machined. FIG. 8 illustrates the kit configured to machine the lower spindle bore 20. With further reference to FIG. 9, it can be appreciated that an arbor extension 170 is positioned between the drill chuck 142 and arbor 144, thereby extending the reamer 146 into the lower spindle bore 20. As shown, the arbor shaft 150 is still engaged by bearing 162, thereby helping to maintain the reamer in concentric alignment with the upper and lower bores, and helping prevent deflection of the reamer.

In an embodiment, the spindle bore repair kit includes the alignment mandrels 100, 102, an alignment rod 104, the necessary nuts and screws for clamping the drill fixture 112, bearing fixture 114 and clamping members 108, 110 together. The kit can also include the alignment bushing 148, modified arbor 144, bearing insert 160 as well as bearing 162, and set screws 164. The kit can also include the arbor shaft 150 for connection to arbor 144. In other embodiments, the kit will also include an appropriately sized reamer 146, and appropriately sized spindle bushings. In still further embodiments the kit may also include a drill press such as magnetic drill press 138 described above.

Although the spindle repair kit is described above with respect to machining both the upper and lower spindle bores and using both the drill fixture and bearing fixture, certain embodiments may include a subset of the described kit components. For example, in an embodiment, the spindle bore repair kit includes a drill fixture, one clamp member, alignment mandrels, and a connecting rod. Furthermore, some embodiments may include instructions including information at least partially related to the use of the alignment mandrels. In other embodiments, the instructions include information relating to the alignment mandrels, drill fixture, bearing fixture, and arbor extension.

In light of the above described spindle bore repair kit, a damaged steering spindle 10 may be repaired by first removing the spindle from the vehicle. Once the spindle is removed from the vehicle, the spindle 10 is clamped in a vice, for example, about wheel spindle 12, thereby firmly holding the spindle 10 in place for machining operations.

Once securely held in place, the steering spindle 10 may be fitted with alignment mandrels 100 and 102 which are retained in the upper and lower spindle bores 18 and 20, respectively, with a threaded alignment rod 104 secured on the mandrels by a pair of nuts 106, as shown in FIG. 2. Threaded alignment rod 104 is inserted through the upper and lower spindle bores 18 and 20 with clamping members 108 and 110 disposed between the upper and lower spindle arms 14 and 16. Alignment mandrels 100 and 102 are placed on the alignment rod 104 such that their frustoconical portions extend into their respective upper and lower spindle bores 18 and 20. Once in position, nuts 106 are threaded onto threaded alignment rod 104 and securely tightened to align the alignment mandrels 100 and 102 with their respective bores. The frustoconical portions of the alignment mandrels align the mandrels with the spindle bores.

Once the alignment mandrels 100 and 102 are secured in the alignment bores, the drill fixture 112 and bearing fixture 114 can be clamped to the upper and lower spindle arms 14 and 16 while being aligned therewith, as shown in FIGS. 3 and 4. Specifically, drill fixture 112 has an alignment aperture 118 which is placed over the upper alignment mandrel 100 thereby aligning the drill fixture concentrically with the upper spindle bore 18. Once in position, fasteners 120 are placed through the clamping member 108 and screwed into threaded holes 124. Similarly, the fasteners 128 are placed through clamping member 110 and screwed into threaded holes 130 in the bearing fixture 114. Fasteners 120 and 128 are tightened, thereby securely clamping the drill fixture 112 and bearing fixture 114 in place.

Once the drill fixture 112 and bearing fixture 114 are securely clamped in place, mandrels 100, 102, alignment rod 104, and nuts 106 may be disassembled and removed, as shown in FIG. 5. With reference to FIG. 6, the alignment bushing 148 may be positioned in alignment aperture 118 to help align reamer 146, which is connected to drill press 138. For example, drill press 138 may be placed onto drill mounting surface 116, however, the magnetic base is left un-activated while the reamer 146 is positioned in bushing 148 for concentric alignment with the bearing bores. Once the reamer 146 is properly aligned in bushing 148, magnetic base 140 is activated, thereby locking drill press 138 in position for the machining operations. Once the drill base 140 is locked in position on drill mounting surface 116, the drill chuck 142 may be raised in order to lift reamer 146 clear of bushing 148, which is now removed.

Next, with reference to FIG. 7, bearing insert 160 along with bearing 162 is installed in the bearing aperture 136. Bearing insert 160 is retained in position by threading set screws 164 into the bearing fixture 114. Arbor shaft 150 is inserted through bearing 162 and threaded into modified arbor 144. Thus, reamer 146 is piloted with respect to the upper and lower spindle bores. At this point, the drill press may be operated in order to machine the upper spindle bore 18.

Once the upper spindle bore 18 has been machined, the process moves to the lower spindle bore 20. In some cases, the stroke of the drill press will not allow access to the lower bore. As such, the reamer must be extended from the drill press. With reference to FIG. 9, an arbor extension 170 is placed between the drill chuck 142 and the arbor 144. Accordingly, as shown in FIG. 9, the drill press may be operated to machine the lower bore concentric to the upper bore. Once both of the upper and lower spindle bores have been machined, the drill press 138 may be removed from the drill fixture and drill, the drill fixture and bearing fixtures may be disassembled from the spindle. Once the repair kit has been removed from the spindle, the repaired spindle may be fitted with new oversized bushings and reinstalled on the vehicle. In one embodiment, oversized bushings are installed without the use of separate inserts, which allows for less material removal from the spindle bores. Thus, the strength of the spindle is maintained. In other embodiments, the spindle repair kit may be used to machine the spindle bores to receive separate inserts along with bushings.

Figure 10:
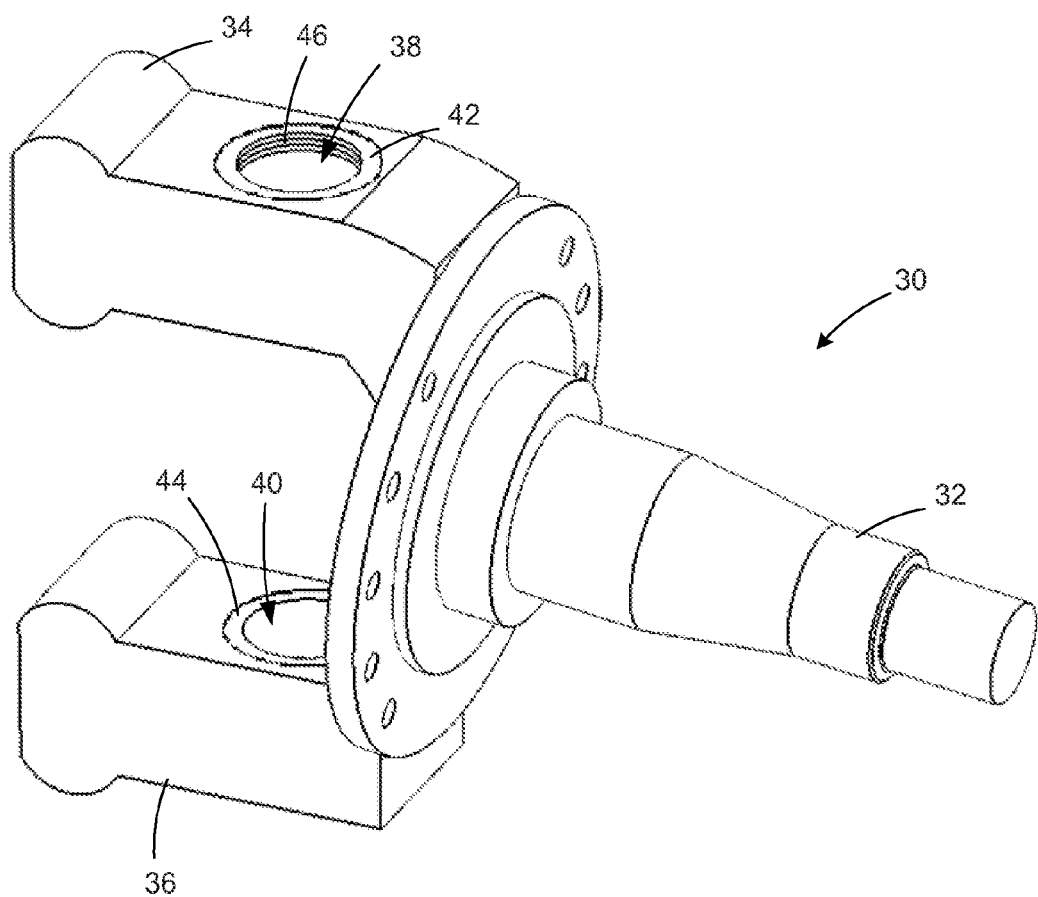
FIG. 10 is a perspective view of another prior art steering spindle.

FIG. 10 is illustrative of another typical prior art kingpin type steering spindle 30. Steering spindle 30 is similar to that described above with respect to FIG. 1 and includes a wheel spindle 32 connected to upper spindle arm 34 and lower spindle arm 36. Each spindle arm includes a spindle bore. For example, upper spindle arm 34 includes upper spindle bore 38 and lower spindle arm 36 includes lower spindle bore 40. In this case, each spindle bore includes end cap threads 46. End cap threads 46 are positioned on the outside of the upper and lower spindle bores. These threads facilitate the installation of end caps which are used for retaining grease and to provide lubrication to the kingpin. Due to the internal threads on the spindle bores (i.e., end cap threads 46) the alignment mandrels potentially will not seat concentric to the spindle bores because the end cap threads 46 are not always concentric to the upper and lower spindle bores. As shown, each spindle bore includes an outer machined surface in the form of outer spot face 42 and an inner machined surface in the form of inner spot face 44. Although spot faced machined surfaces are shown in the figure, other suitable machined surfaces may be provided on the spindle from the manufacturer of the spindle.

Figure 11:
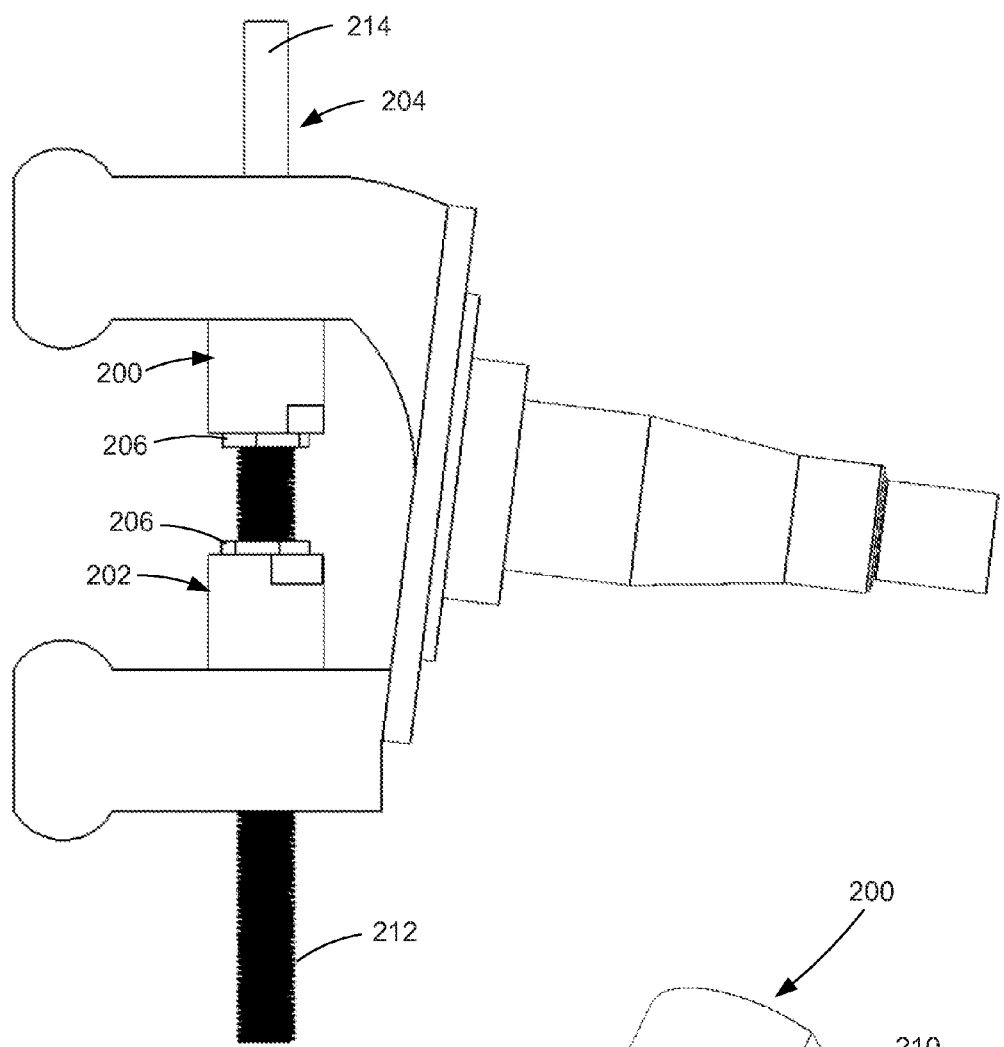
FIG. 11 is a perspective view of a steering spindle fitted with an alignment mandrel arrangement according to another exemplary embodiment.
Figure 12:
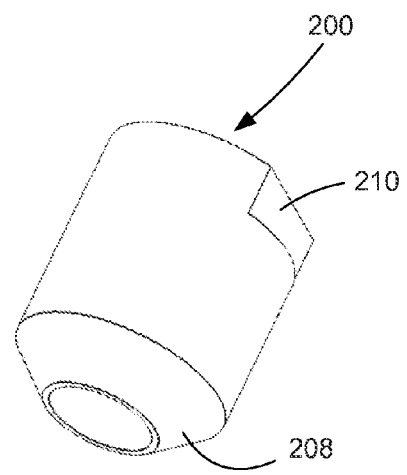
FIG. 12 is a perspective view of a mandrel shown in FIG. 11.

With reference to FIG. 11, a pair of alignment mandrels 200 and 202 are positioned in the upper and lower spindle bores 38 and 40 respectively. Mandrels 200 and 202 are retained in the spindle bores by an alignment rod 204 that is operative to retain the mandrels in their respective bores. In this embodiment, the alignment rod includes a threaded portion 212 and a machined portion 214. The alignment rod 204 is secured to the mandrels 200 and 202 by a pair of jam nuts 206 which are threaded onto the threaded portion 212. Jam nuts 206 are tightened against their respective mandrels 200 and 202 thereby urging the mandrels into their respective spindle bores. Turning to FIG. 12, each mandrel, such as mandrel 200 shown in FIG. 12, includes a frustoconical portion 208 that self-aligns with the bore diameter of the spindle bores. Mandrel 200 also includes wrench flats 210 to facilitate tightening the jam nuts 206 against the mandrel.

Figure 13:
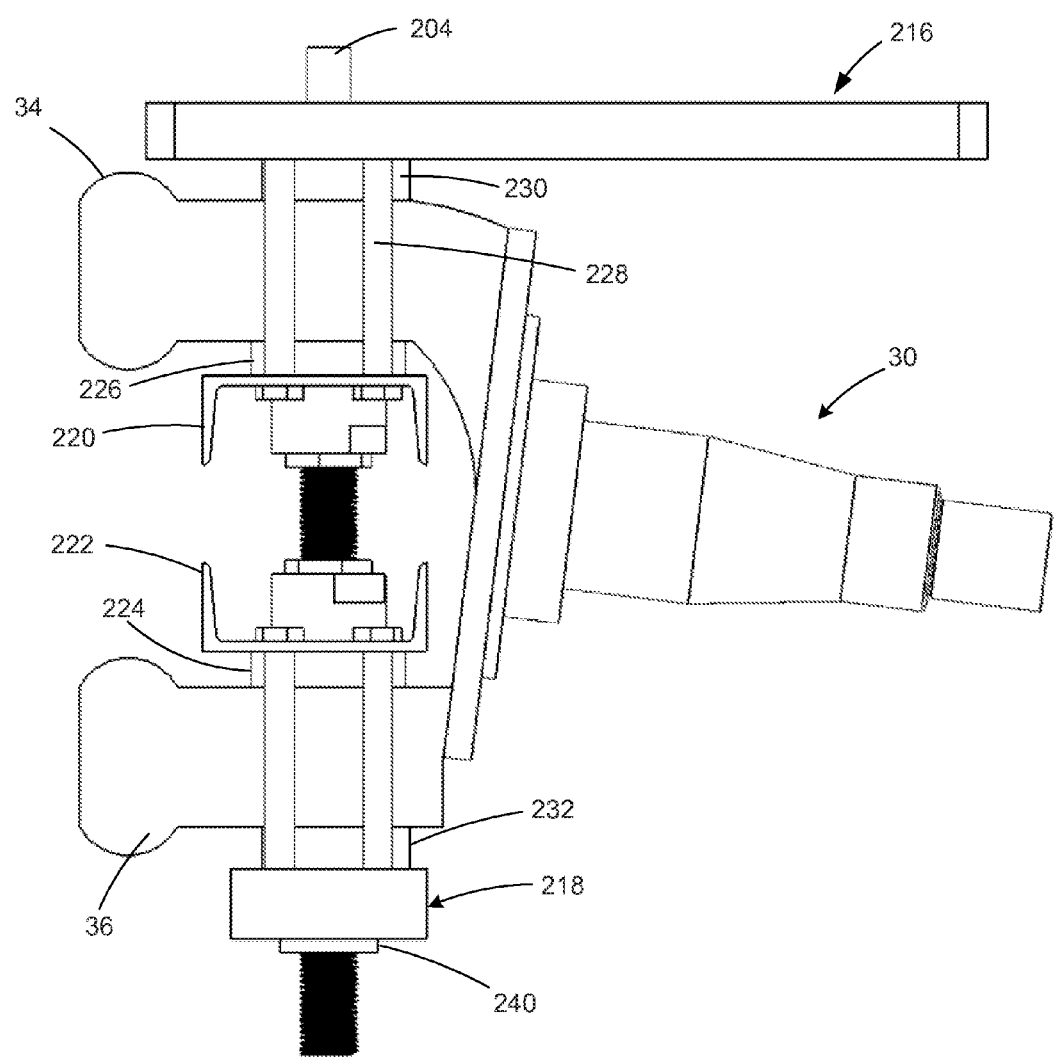
FIG. 13 is a side view in elevation of the steering spindle shown in FIG. 11 with the drill fixture and bearing fixture attached thereto.
Figure 14:
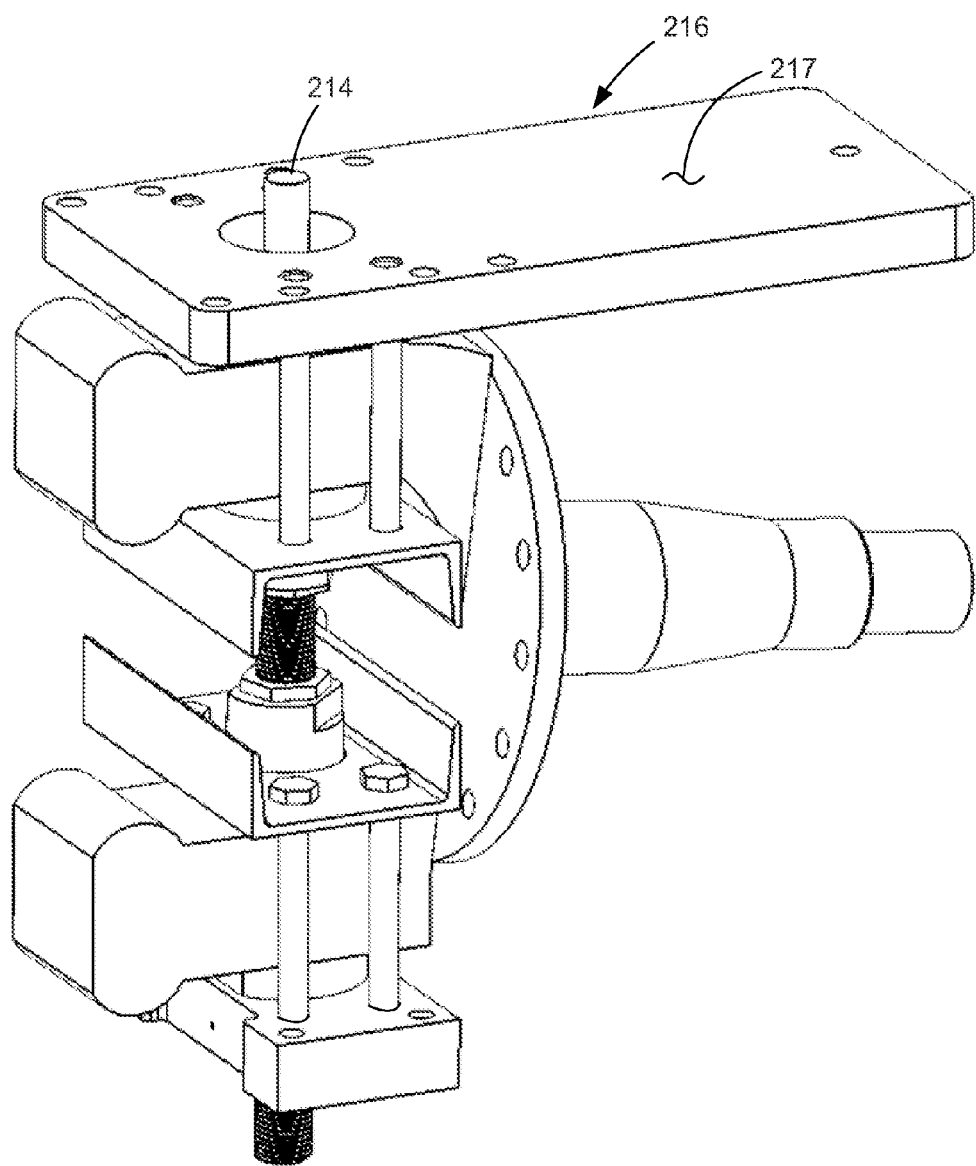
FIG. 14 is a perspective view of the steering spindle shown in FIG. 13.
Figure 15:
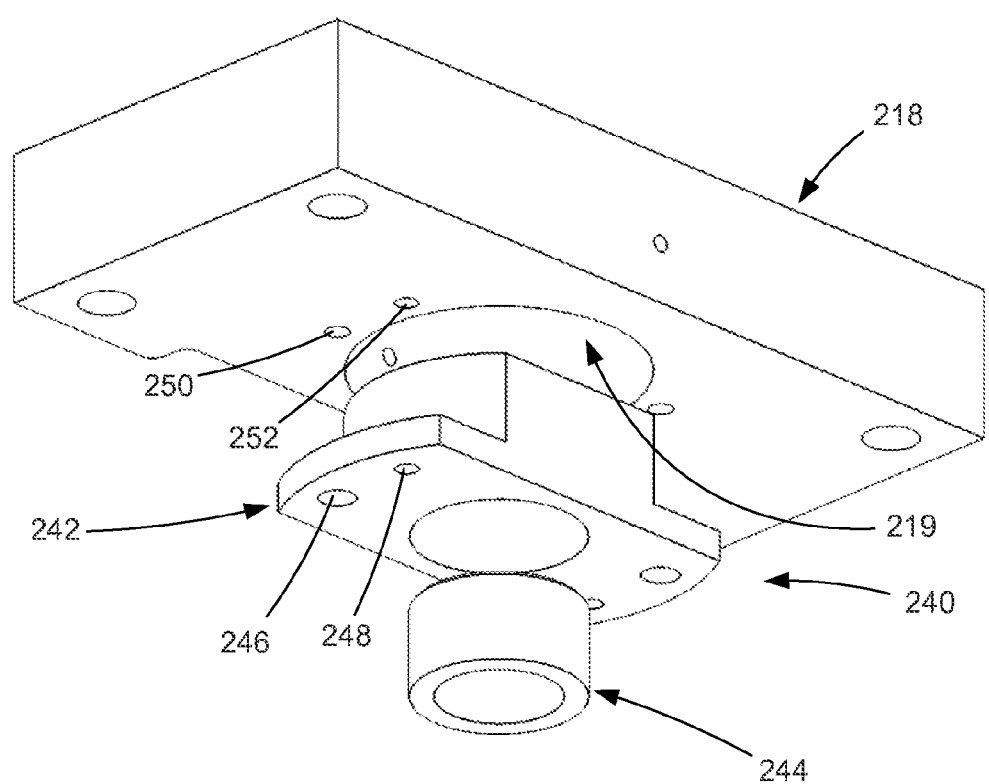
FIG. 15 is an exploded perspective view of the lower bearing fixture shown in FIGS. 13 and 14.

Once the alignment mandrels are positioned onto the upper and lower spindle bores, the drill fixture and bearing fixture can be attached to the steering spindle 30. As shown in FIG. 13, drill fixture 216 is positioned onto upper spindle arm 34 and clamped in position by clamping member 220. Similarly bearing fixture 218 is positioned on lower spindle arm 36 and clamped in position by clamping member 222. An outer spacer ring 230 is positioned between drill fixture 216 and upper spindle arm 34. Spacer ring 230 is configured to mate with outer spot face 42, or other similar faces, of upper spindle arm 34 (see FIG. 10). Spacer ring 230 provides a parallel interface between drill fixture 216 and upper spindle arm 34. In this way the drill fixture 216 is held parallel to the machined surfaces and perpendicular to the spindle bores without interfering with the uneven surfaces of the cast steering spindle.

Each clamping member 220 and 222 are similarly spaced from the inside of their respective steering spindle arms by an inner spacer ring 226 and 224, respectively. Inner spacer rings 226 and 224 mate with inner spot face surfaces 44, or other similar faces (see FIG. 10). Clamping members 220 and 222 are in the form of C channels that provides structural rigidity against the clamping forces of fasteners 228. Outer spacer ring 232 is positioned between bearing fixture 218 and lower spindle arm 36. Similar to spacer ring 230, outer spacer ring 232 is configured to mate with the outer spot face 42, or other similar faces, of the lower spindle arm 36. Bearing fixture 218 carries bearing insert 240. It should be appreciated at this point that alignment rod 204 provides the alignment surfaces to position the bearing insert 240 and the drill press 138 concentric with the upper and lower spindle bores 38 and 40. Accordingly, alignment rod 204 has a tightly toleranced fit with the alignment mandrels 200 and 202. Thus, the threaded portion 212 of alignment rod 204 is preferably a tightly toleranced component and in some embodiments includes square threads. Square threads provide a cylindrical surface which mates with the mandrels and with the bearing fixture. ACME® threaded rod is an example of a suitable alignment rod material.

Once the drill fixture 216 and bearing fixture 218 are securely mounted in position, the drill press is placed onto drill mounting surface 217 and the spindle of the drill press is aligned to the machined portion 214 of alignment rod 204. As show in FIG. 14, once the drill press is securely mounted to the drill mounting surface 217 the alignment rod 204, mandrels 200 and 202, as well as jam nuts 206 may be removed.

Lower bearing fixture 218 receives bearing insert 240. Bearing insert 240 includes a bearing holder 242 that receives a bearing or hardened drill guide 244. Bearing holder 242 is inserted into bearing aperture 219 and is secured to the lower bearing fixture 218 by suitable fasteners. For example, threaded fasteners may extend through mounting aperture 246 and thread into lower bearing fixture threaded holes 250. In order to precisely align the bearing insert 240 with the lower bearing fixture 218, the bearing holder can be positioned with alignment pins inserted through pin aperture 248 and hole 252.

Figure 16:
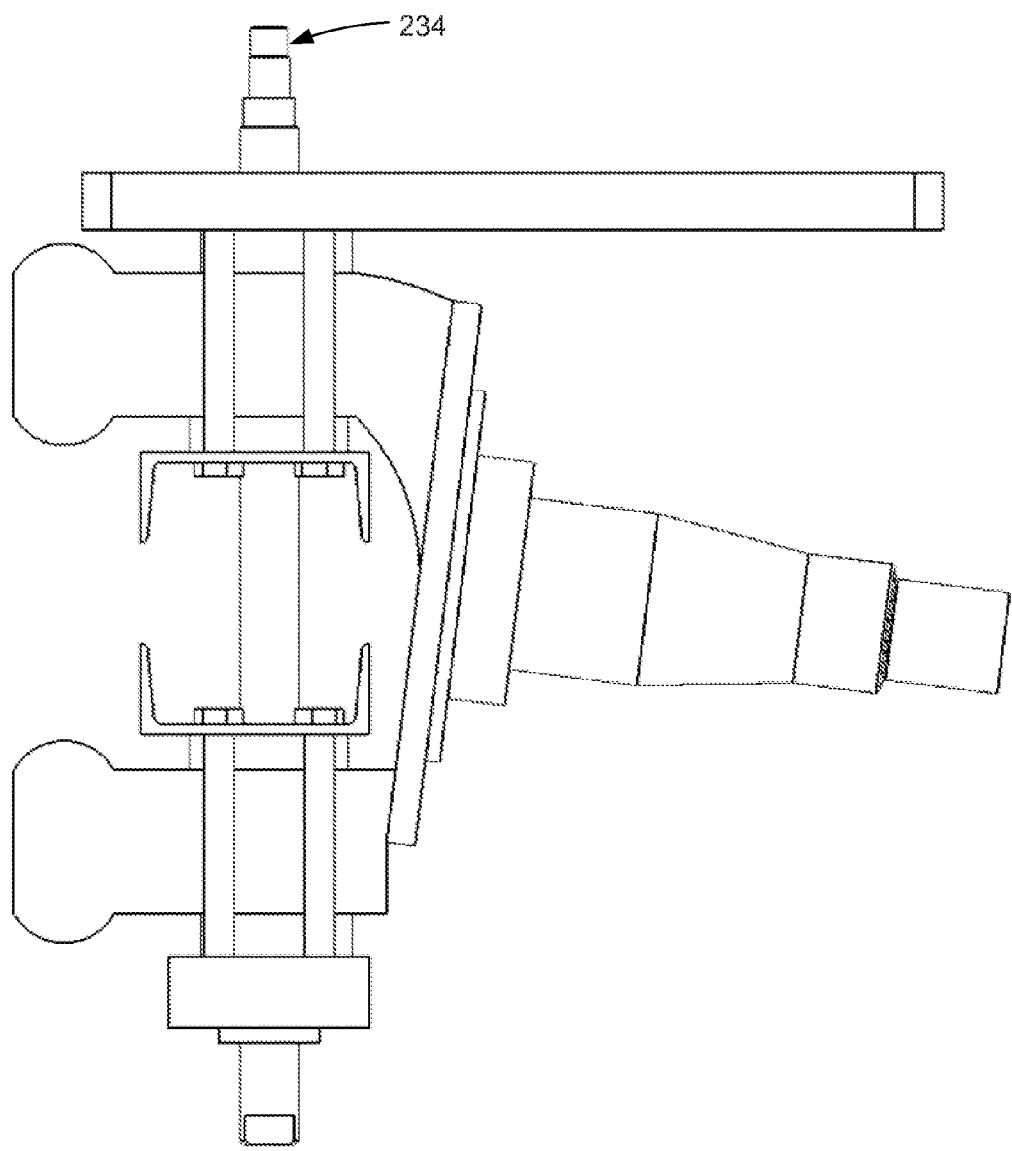
FIG. 16 is a side view in elevation of the steering spindle shown in FIGS. 13 and 14 with the mandrels and alignment rod removed and replaced by an arbor shaft.
Figure 17:
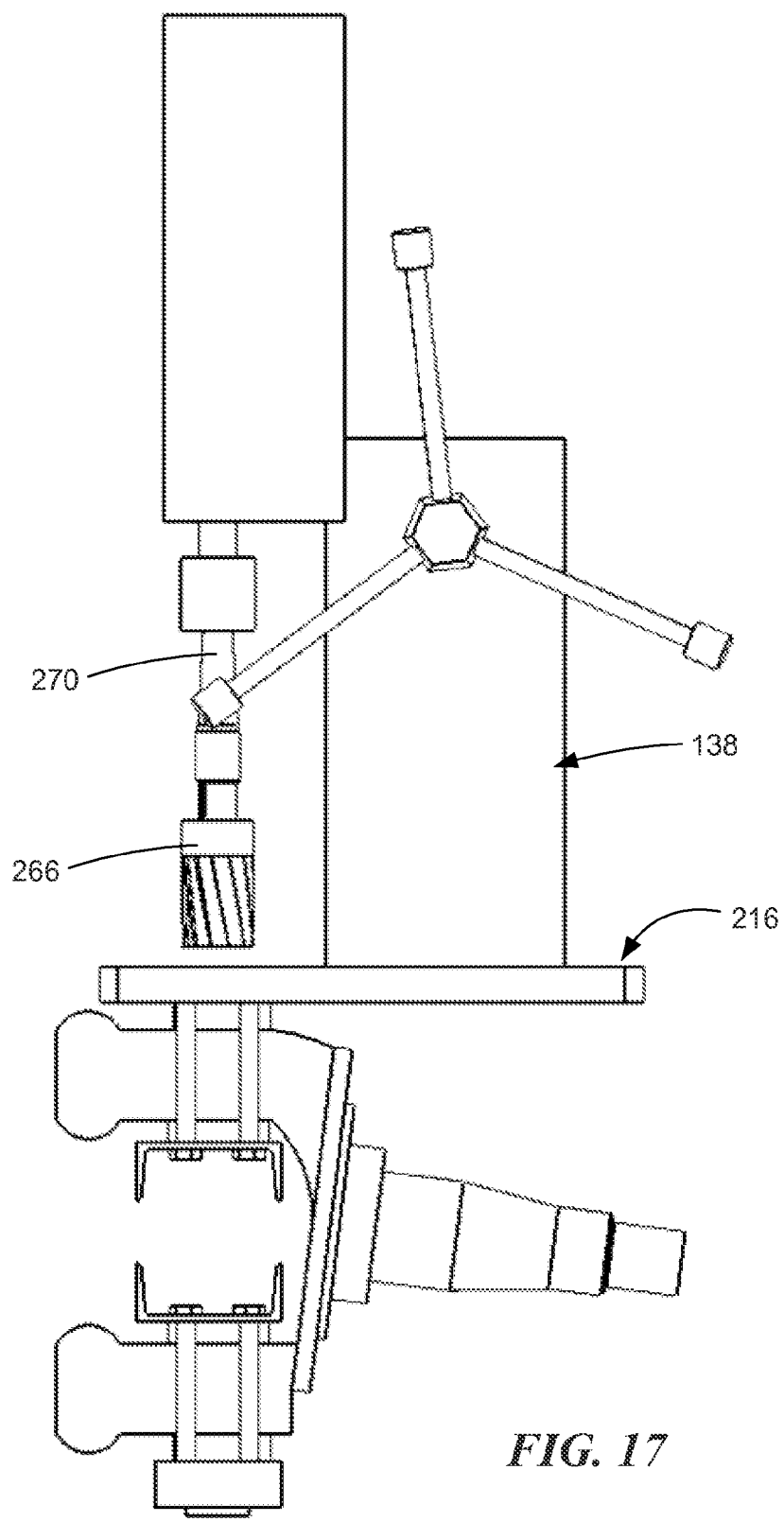
FIG. 17 is a side view in elevation of a repair kit according to a still further exemplary embodiment.
Figure 18:
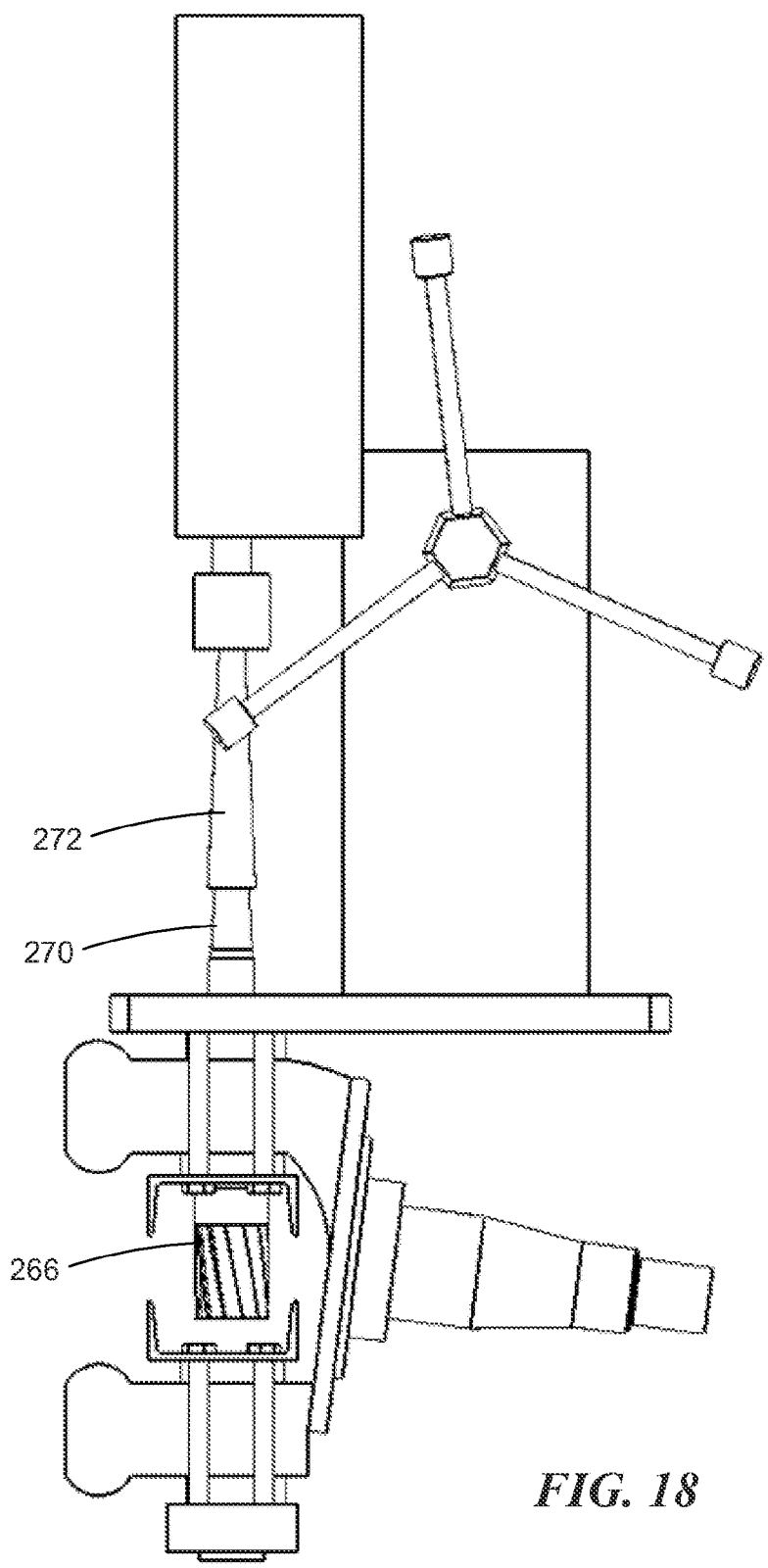
FIG. 18 is a side view in elevation of the repair kit shown in FIG. 21 configured to repair the lower spindle bore.

With reference to FIG. 16, once the alignment mandrel and alignment rod are removed from the fixture, arbor shaft 234 may be installed into bearing insert 240 and secured to the spindle of the drill press. At this point the fixture may now be further configured to machine the upper and lower bores as described above with respect to FIGS. 7-9. Alternatively, as shown in FIG. 17, drill press 138 may be fitted with a Morse taper arbor 270 which carries reamer 266. In this configuration, the drill press is ready to machine the upper spindle bore. As shown in FIG. 18, the fixture may be configured with a Morse taper arbor extension 272 which carries the Morse taper arbor 270 which in turn carries the reamer 266. In this configuration, the drill press is positioned to machine the lower spindle bore.

Figure 19:
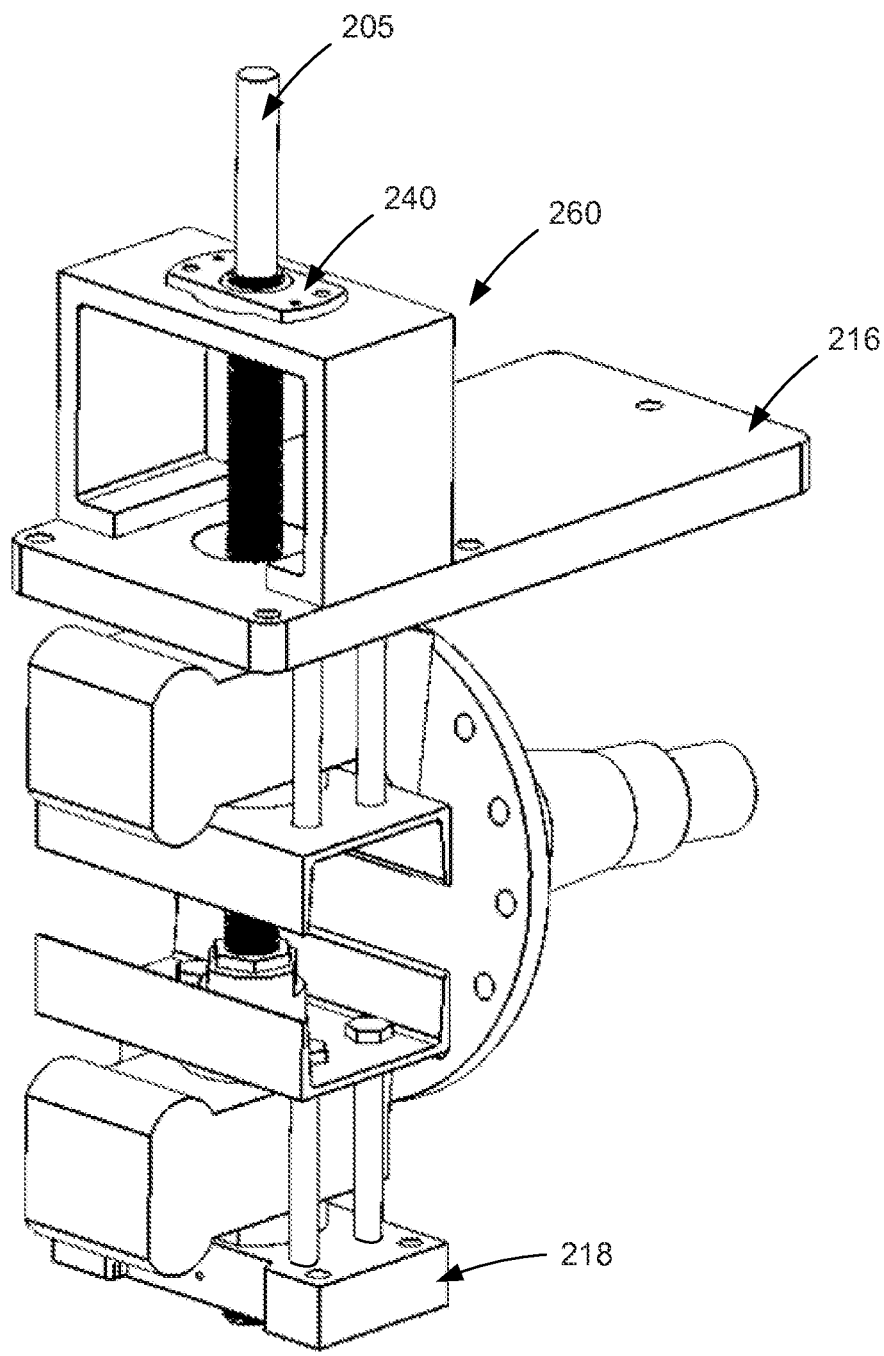
FIG. 19 is a perspective view of the steering spindle fitted with an alignment fixture according to a further exemplary embodiment.
Figure 20:
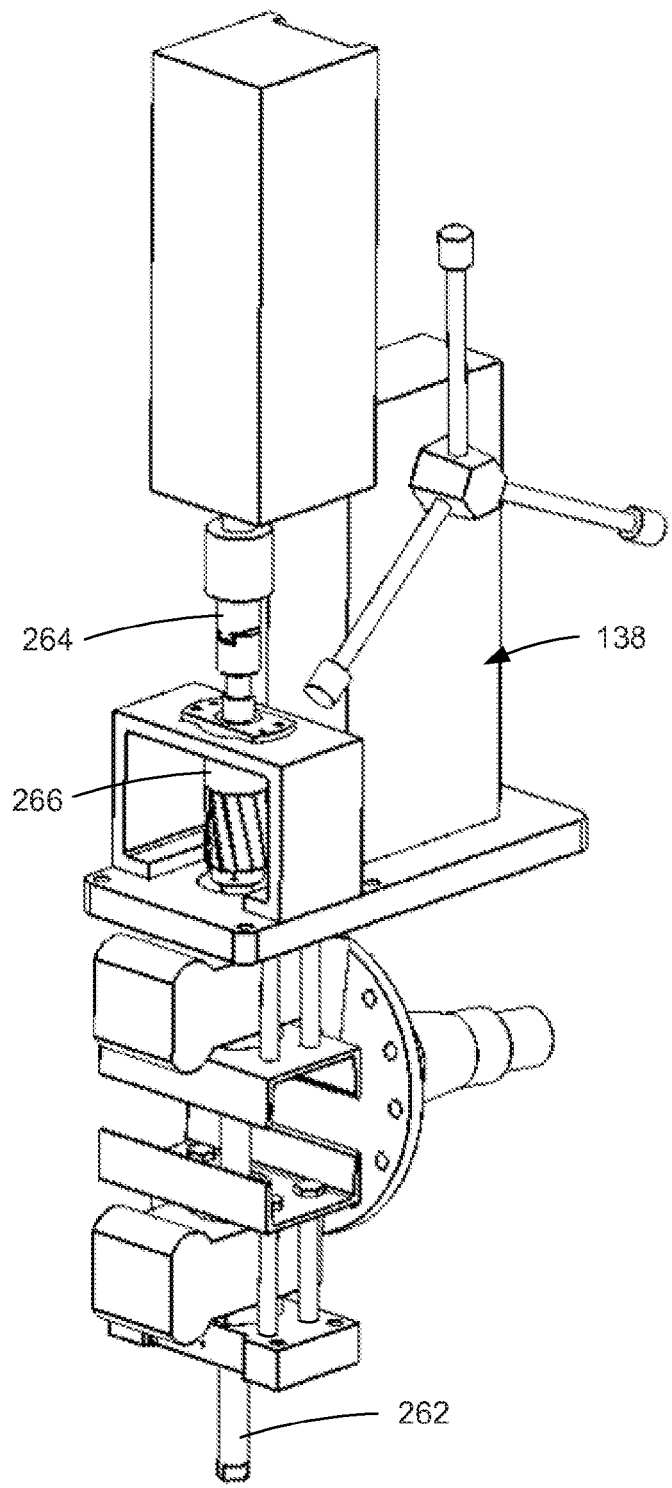
FIG. 20 is a perspective view of the steering spindle and repair kit configured for repairing the upper spindle bore.
Figure 21:
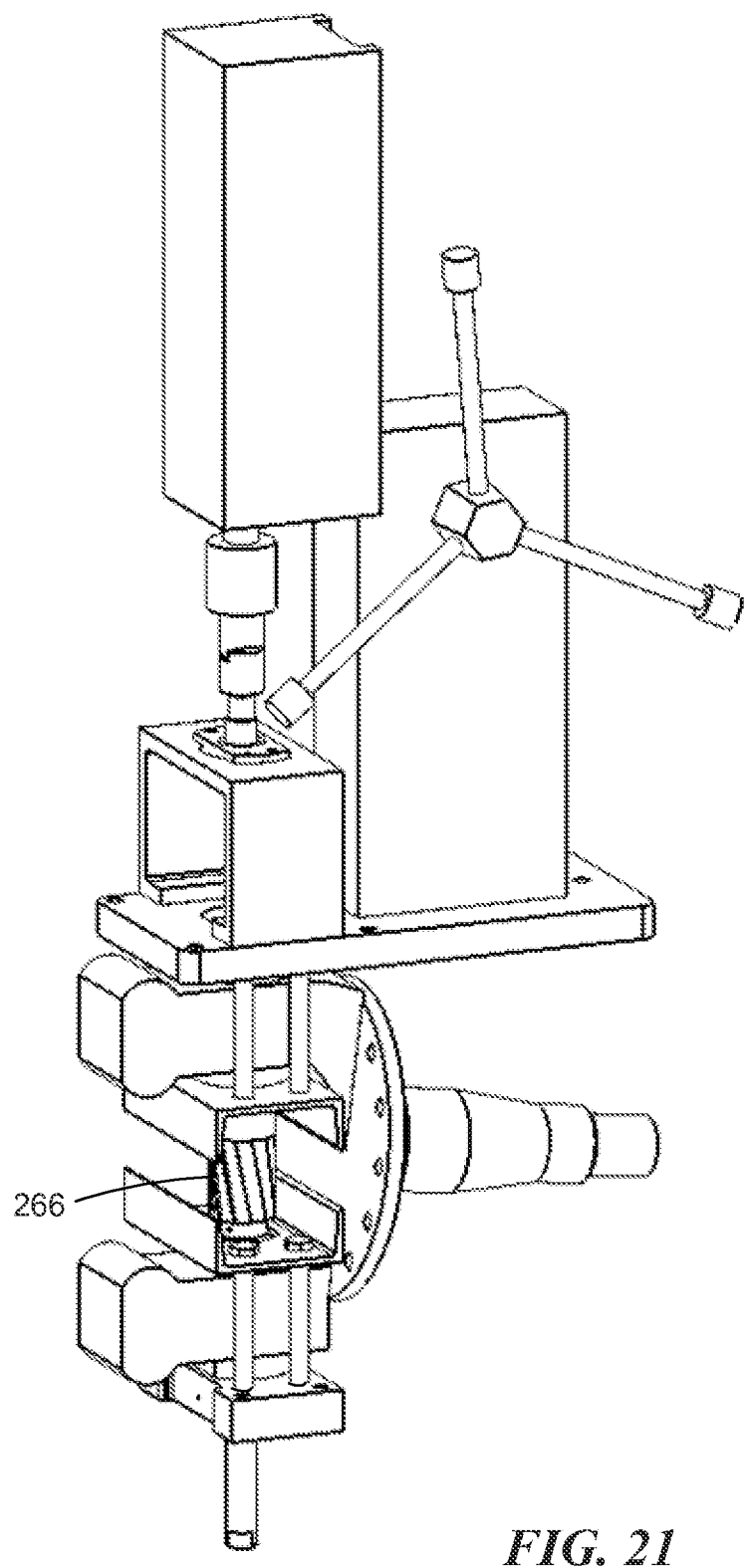
FIG. 21 is a perspective view of the steering spindle and repair kit configured for repairing the lower spindle bore.
Figure 22:
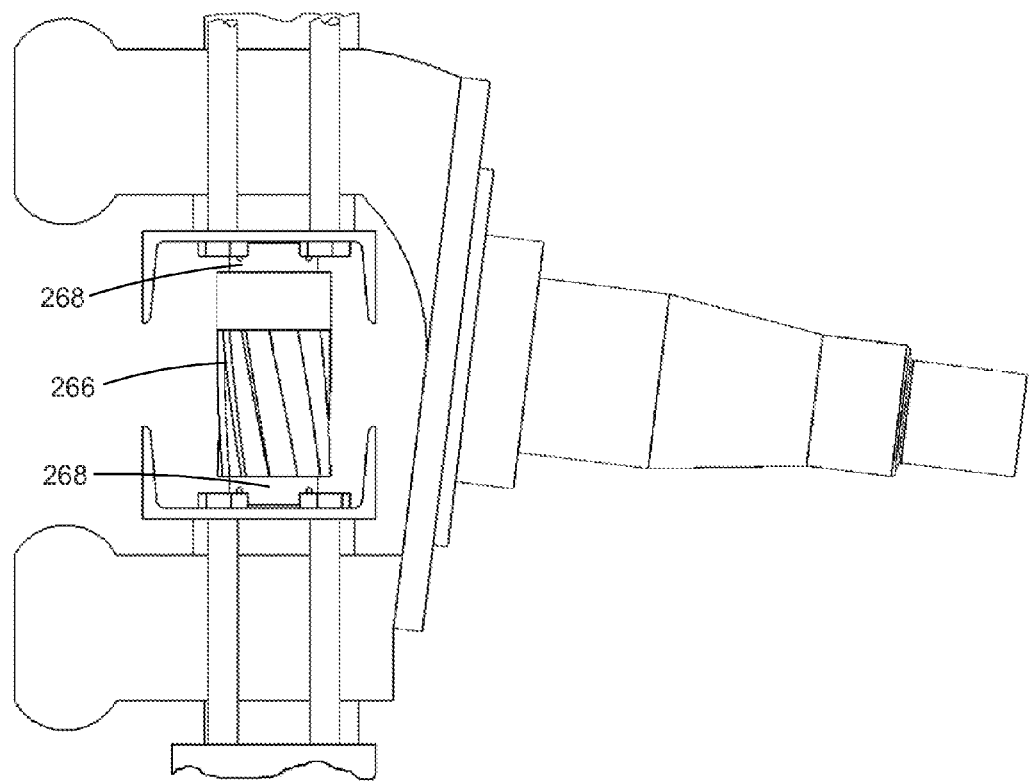
FIG. 22 is a partial side view illustrating the reamer and collars positioned for machining the lower spindle bore.

FIG. 19 illustrates another embodiment of the bearing repair kit including an upper bearing fixture 260. Upper bearing fixture 260 is mounted to the drill fixture 216. Upper bearing fixture 260 is configured to receive a bearing insert 240 such as that described above with respect to FIG. 15. Alignment rod 205 is sized to extend between the upper bearing insert 240 and lower bearing insert 240 positioned in the lower bearing fixture 218. As shown in FIG. 20 the alignment rod 205 is replaced by drill rod shaft 262. Drill rod shaft 262 carries reamer 266 which may be configured to machine the upper spindle bore and the lower spindle bore. Drill press 138 connects to drill rod shaft 262 via a universal joint 264. Thus, in this embodiment, alignment of drill press 138 is not as critical due to the tolerance provided by universal joint 264. As shown in FIG. 20, the kit is configured with reamer 266 within the upper bearing fixture for machining the upper spindle bore. As shown in FIG. 21 reamer 266 is positioned so that the lower bore may be machined. As shown in FIG. 22 reamer 266 is retained in position along drill rod shaft 262 by a pair of collars 268. Reamer 266 is pinned to collars 268 thereby coupling the reamer 266 to the drill rod shaft 262 for rotation therewith.

In an embodiment, the spindle bore repair kit includes the alignment mandrels 200, 202, an alignment rod 204, the necessary nuts and screws for clamping the drill fixture 216, bearing fixture 218 and clamping members 220, 222 together. The kit can also include the spacer rings 230, 232, 224, 226, drill rod 234, bearing holder 242 as well as bearing 244. The kit can also include the arbor shaft 270 and arbor extension 272. In other embodiments, the kit will also include an appropriately sized reamer 266, and in still further embodiments the kit may also include a drill press such as magnetic drill press 138 described above.

Also disclosed herein are methods for repairing a spindle having first and second spindle bores. In an embodiment, the method comprises positioning alignment mandrels in each of the first and second spindle bores. An alignment aperture of a drill fixture is positioned about one of the mandrels and is retained in position with respect to the spindle. Once the drill fixture is retained in position, the mandrels are removed from the first and second spindle bores. A reamer is connected to a drill which is mounted to the drill fixture while it is aligned with the alignment aperture. Once aligned and secured, the drill is operated to repair at least one of the first and second spindle bores. In other embodiments, the method includes positioning a bearing aperture of a bearing fixture about one of the mandrels and retaining the bearing fixture in position with respect to the spindle. The method may also comprise connecting the reamer to the drill with an arbor. The method may further comprise mounting a bearing in the bearing aperture and inserting an arbor shaft through the bearing, wherein the arbor shaft is connected to the arbor. In other embodiments, the method includes installing an arbor extension between the drill and arbor and operating the drill to repair the second spindle bore. In still further embodiments, the method comprises piloting the reamer in relation to both the first and second spindle bores. The reamer may be piloted with respect to first and second spindle bores with an alignment bushing disposed in the alignment aperture of the drill fixture and the reamer is piloted with respect to the second spindle bore by a bearing positioned concentric to the second bore in a shaft extending away from the reamer and through the bearing.

In another embodiment, the method comprises positioning an alignment mandrel in each of the first and second spindle bores. The alignment mandrels are temporarily retained in their respective spindle bores with an alignment rod. An alignment aperture of a bearing fixture is positioned about the alignment rod and retaining the bearing fixture in position with respect to the spindle. A drill fixture is retained in position with respect to the spindle. A drill is mounted to the drill fixture while aligning the drill with the alignment rod. The mandrels and the alignment rod are subsequently removed from the first and second spindle bores. A reamer is connected to the drill and the drill is operated to repair at least one of the first and second spindle bores.

From the foregoing it will be appreciated that, although specific embodiments of the technology have been described herein for purposes of illustration, various modifications may be made without deviating from the spirit and scope of the technology. Further, certain aspects of the new technology described in the context of particular embodiments may be combined or eliminated in other embodiments. Moreover, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein. Thus, the disclosure is not limited except as by the appended claims.

What is claimed is:

1. A spindle repair kit for a spindle having first and second spindle arms with first and second spindle bores, the kit comprising:
   a pair of alignment mandrels, each positionable in a respective one of the first and second spindle bores;
   an alignment rod connectable to the alignment mandrels and operative to retain the mandrels in their respective spindle bores;
   a first clamp member positionable between the spindle bores;
   a drill fixture including a drill mounting surface;
   a first plurality of fasteners capable of clamping the drill fixture and first clamp member to the first spindle arm;
   a second clamp member positionable between the spindle bores;
   a bearing fixture including a bearing aperture sized to receive the alignment rod; and
   a second plurality of fasteners capable of clamping the bearing fixture and second clamp member to the second spindle arm.

2. The kit of claim 1, further comprising instructions including information at least partially related to the use of the alignment mandrels.

3. The kit of claim 1, further comprising a drill mountable to the drill mounting surface.

4. The kit of claim 1, further comprising an arbor including a first end portion connectable to a drill and a second end portion connectable to a reamer.

5. The kit of claim 4, further comprising an arbor extension positionable between the drill and arbor and sized to position the reamer in the second spindle bore.

6. The kit of claim 1, further comprising a spindle.

7. A spindle repair kit for a spindle having first and second spindle arms with first and second spindle bores, the kit comprising:
   a pair of alignment mandrels, each including a frustoconical portion positionable in a respective one of the first and second spindle bores;
   an alignment rod extendable through the alignment mandrels and operative to retain the mandrels in their respective spindle bores;
   a first clamp member and a second clamp member, each positionable between the spindle bores;
   a drill fixture including a drill mounting surface;
   a bearing fixture including a bearing aperture and a bearing positionable in the bearing aperture;
   a first plurality of fasteners capable of clamping the drill fixture and first clamp member to the first spindle arm;
   a second plurality of fasteners capable of clamping the bearing fixture and second clamp member to the second spindle arm; and
   a drill rod including a first end portion connectable to a drill and a second end portion extendable through the bearing, wherein a reamer can be selectively positioned between the first end portion and second end portion.

8. The kit of claim 7, further comprising instructions including information at least partially related to the use of the alignment mandrels, drill fixture, bearing fixture, and drill rod.

9. The kit of claim 7, further comprising a magnetic drill press.

10. The kit of claim 7, further comprising a bearing holder positionable in the bearing aperture wherein the bearing is retained in the bearing holder.

11. The kit of claim 7, further comprising at least one oversized bushing.

12. The kit of claim 11, further comprising a plurality of oversized bushings of different sizes.

13. The kit of claim 7, further comprising an upper bearing fixture attachable to the drill fixture.

\* \* \* \* \*